(12) United States Patent
Shveidel et al.

(10) Patent No.: US 11,687,245 B2
(45) Date of Patent: Jun. 27, 2023

(54) DYNAMIC SLICE ASSIGNMENT IN A DISTRIBUTED STORAGE SYSTEM

(71) Applicant: EMC IP Holding Company LLC, Hopkinton, MA (US)

(72) Inventors: Vladimir Shveidel, Pardes-Hana (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 16/952,996

(22) Filed: Nov. 19, 2020

(65) Prior Publication Data

US 2022/0155968 A1 May 19, 2022

(51) Int. Cl.
*G06F 3/06* (2006.01)

(52) U.S. Cl.
CPC ............ *G06F 3/0611* (2013.01); *G06F 3/067* (2013.01); *G06F 3/0635* (2013.01); *G06F 3/0653* (2013.01)

(58) Field of Classification Search
CPC .... G06F 3/0611; G06F 3/0631; G06F 3/0635; G06F 3/0653; G06F 3/067; G06F 11/3034; G06F 11/3037; G06F 11/3041
USPC .............. 710/5–7, 15–19, 74, 20; 711/154, 711/167–169, 168; 709/224–226, 235; 370/229–240; 714/815; 718/105; 725/96
See application file for complete search history.

(56) References Cited

U.S. PATENT DOCUMENTS 7,165,155 B1   1/2007  Duprey et al.
7,440,982 B2  10/2008  Lu et al.
7,444,464 B2  10/2008  Urmston et al.
(Continued)

FOREIGN PATENT DOCUMENTS

WO         2016111954 A1    7/2016
WO  PCT/US2019/024885      1/2020
(Continued)

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Ilwoo Park
(74) *Attorney, Agent, or Firm* — Ryan, Mason & Lewis, LLP

(57) ABSTRACT

An apparatus comprises at least one processing device that includes a processor coupled to a memory, and is configured to monitor latencies associated with processing of input-output operations in a plurality of storage nodes of a distributed storage system, to detect an unbalanced condition between the storage nodes based at least in part on the monitored latencies, and responsive to the detected unbalanced condition, to adjust an assignment of slices of a logical address space of the distributed storage system to the storage nodes. Adjusting the assignment of slices of the logical address space of the distributed storage system to the storage nodes responsive to the detected unbalanced condition illustratively comprises increasing a number of the slices assigned to one or more of the storage nodes having relatively low latencies and decreasing a number of slices assigned to one or more of the storage nodes having relatively high latencies.

21 Claims, 7 Drawing Sheets

(56) References Cited

U.S. PATENT DOCUMENTS

| | | | |
|---|---|---|---|
| 7,779,416 B2* | 8/2010 | Koga | G06F 9/5055 |
| | | | 718/105 |
| 8,095,726 B1 | 1/2012 | O'Connell et al. | |
| 8,214,612 B1 | 7/2012 | Natanzon | |
| 8,301,593 B2 | 10/2012 | Hoffmann et al. | |
| 8,335,899 B1 | 12/2012 | Meiri et al. | |
| 9,104,326 B2 | 8/2015 | Frank et al. | |
| 9,208,162 B1 | 12/2015 | Hallak et al. | |
| 9,286,003 B1 | 3/2016 | Hallak et al. | |
| 9,514,014 B2 | 12/2016 | Webman et al. | |
| 9,552,258 B2 | 1/2017 | Hallak et al. | |
| 9,606,870 B1 | 3/2017 | Meiri et al. | |
| 9,716,754 B2 | 7/2017 | Swift | |
| 9,891,994 B1 | 2/2018 | Schneider et al. | |
| 9,983,937 B1 | 5/2018 | Shveidel | |
| 10,048,874 B1 | 8/2018 | Shveidel et al. | |
| 10,152,232 B1 | 12/2018 | Kleiner et al. | |
| 10,176,046 B1 | 1/2019 | Hu et al. | |
| 10,261,693 B1 | 4/2019 | Schneider et al. | |
| 10,324,640 B1 | 6/2019 | Chen et al. | |
| 10,338,851 B1 | 7/2019 | Kronrod et al. | |
| 10,359,965 B1 | 7/2019 | Strange et al. | |
| 10,394,485 B1 | 8/2019 | Chen et al. | |
| 10,437,501 B1 | 10/2019 | Kucherov et al. | |
| 10,437,855 B1 | 10/2019 | Strange et al. | |
| 10,466,925 B1 | 11/2019 | Blanco et al. | |
| 10,474,496 B1 | 11/2019 | Kamran et al. | |
| 10,496,324 B2 | 12/2019 | Meiri et al. | |
| 10,496,489 B1 | 12/2019 | Chen et al. | |
| 10,496,672 B2 | 12/2019 | Meiri et al. | |
| 10,558,613 B1 | 2/2020 | Shveidel et al. | |
| 10,592,159 B2 | 3/2020 | Kucherov et al. | |
| 10,592,161 B1 | 3/2020 | Chen et al. | |
| 10,606,519 B1 | 3/2020 | Shveidel | |
| 10,635,533 B2 | 4/2020 | Schneider et al. | |
| 10,684,915 B2 | 6/2020 | Schneider et al. | |
| 10,691,355 B2 | 6/2020 | Kucherov et al. | |
| 10,691,373 B2 | 6/2020 | Harduf et al. | |
| 10,691,551 B2 | 6/2020 | Meiri et al. | |
| 10,698,772 B2 | 6/2020 | Hu et al. | |
| 10,705,965 B2 | 7/2020 | Shveidel et al. | |
| 10,719,253 B2 | 7/2020 | Alkalay et al. | |
| 10,725,855 B2 | 7/2020 | Shani et al. | |
| 10,754,559 B1 | 8/2020 | Meiri et al. | |
| 10,754,575 B2 | 8/2020 | Strange | |
| 10,754,736 B2 | 8/2020 | Shani et al. | |
| 10,761,933 B2 | 9/2020 | Moore et al. | |
| 10,783,038 B2 | 9/2020 | Moore et al. | |
| 10,817,385 B2 | 10/2020 | Meiri et al. | |
| 10,824,512 B2 | 11/2020 | Resnik et al. | |
| 10,826,990 B2 | 11/2020 | Kamran et al. | |
| 10,831,407 B2 | 11/2020 | Glimcher et al. | |
| 10,831,735 B2 | 11/2020 | Schneider et al. | |
| 10,838,863 B2 | 11/2020 | Kamran et al. | |
| 11,449,502 B1* | 9/2022 | Richards | G06F 16/2453 |
| 2005/0021591 A1* | 1/2005 | Boyd | G06F 11/2064 |
| | | | 709/200 |
| 2007/0022121 A1 | 1/2007 | Bahar et al. | |
| 2007/0050504 A1 | 3/2007 | Gomez et al. | |
| 2008/0279462 A1 | 11/2008 | Cell, Jr. | |
| 2009/0132955 A1 | 5/2009 | Garg et al. | |
| 2009/0276593 A1 | 11/2009 | Jacobson et al. | |
| 2010/0179941 A1 | 7/2010 | Agrawal et al. | |
| 2010/0315255 A1 | 12/2010 | Chang et al. | |
| 2011/0022566 A1 | 1/2011 | Beaverson et al. | |
| 2011/0225123 A1 | 9/2011 | D'Souza et al. | |
| 2012/0124282 A1 | 5/2012 | Frank et al. | |
| 2013/0305002 A1 | 11/2013 | Hallak et al. | |
| 2013/0325824 A1 | 12/2013 | Shoens | |
| 2014/0181016 A1 | 6/2014 | Whitehead et al. | |
| 2014/0244935 A1 | 8/2014 | Ezra et al. | |
| 2014/0304437 A1* | 10/2014 | Ashok | G06F 3/0659 |
| | | | 710/18 |
| 2015/0378766 A1 | 12/2015 | Beveridge et al. | |
| 2015/0378785 A1 | 12/2015 | Tarasuk-Levin et al. | |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2016/0261513 A1 | 9/2016 | Aingaran et al. | |
| 2016/0345207 A1 | 11/2016 | Kwak et al. | |
| 2017/0075842 A1 | 3/2017 | Su et al. | |
| 2017/0185529 A1 | 6/2017 | Chhabra et al. | |
| 2017/0192857 A1 | 7/2017 | Meiri et al. | |
| 2017/0371777 A1* | 12/2017 | Kim | G06F 9/5016 |
| 2018/0095873 A1 | 4/2018 | Nakagoe et al. | |
| 2019/0303490 A1 | 10/2019 | Chen et al. | |
| 2019/0332314 A1 | 10/2019 | Zhang et al. | |
| 2019/0370354 A1 | 12/2019 | Kucherov et al. | |
| 2019/0370355 A1 | 12/2019 | Kucherov et al. | |
| 2019/0370356 A1 | 12/2019 | Kucherov et al. | |
| 2019/0370357 A1 | 12/2019 | Kucherov et al. | |
| 2019/0392060 A1 | 12/2019 | Meiri et al. | |
| 2020/0026616 A1 | 1/2020 | Hu et al. | |
| 2020/0097174 A1 | 3/2020 | Moore et al. | |
| 2020/0097363 A1 | 3/2020 | Moore et al. | |
| 2020/0097393 A1 | 3/2020 | Moore et al. | |
| 2020/0125276 A1 | 4/2020 | Shani et al. | |
| 2020/0218601 A1 | 7/2020 | Schneider et al. | |
| 2020/0218610 A1 | 7/2020 | Schneider et al. | |
| 2020/0225849 A1 | 7/2020 | Meiri et al. | |
| 2020/0226023 A1 | 7/2020 | Meiri | |
| 2020/0226145 A1 | 7/2020 | Meiri | |
| 2020/0233704 A1 | 7/2020 | Alkalay et al. | |
| 2020/0233705 A1 | 7/2020 | Alkalay et al. | |
| 2020/0233881 A1 | 7/2020 | Harduf et al. | |
| 2020/0242130 A1 | 7/2020 | Chen et al. | |
| 2020/0249868 A1 | 8/2020 | Glimcher et al. | |
| 2020/0249869 A1 | 8/2020 | Glimcher et al. | |
| 2020/0250089 A1 | 8/2020 | Kamran et al. | |
| 2020/0250144 A1 | 8/2020 | Natanzon et al. | |
| 2020/0272542 A1 | 8/2020 | Meiri et al. | |
| 2020/0272600 A1 | 8/2020 | Natanzon et al. | |
| 2020/0285268 A1 | 9/2020 | Meiri et al. | |
| 2020/0285402 A1 | 9/2020 | Meiri et al. | |
| 2020/0301784 A1 | 9/2020 | Chen | |
| 2020/0310649 A1 | 10/2020 | Chen et al. | |
| 2020/0310654 A1 | 10/2020 | Meiri et al. | |
| 2020/0326877 A1 | 10/2020 | Chen et al. | |
| 2020/0327024 A1 | 10/2020 | Alkalay et al. | |
| 2020/0341641 A1 | 10/2020 | Kucherov et al. | |
| 2020/0341682 A1 | 10/2020 | Kucherov et al. | |
| 2020/0341749 A1 | 10/2020 | Bashi et al. | |
| 2020/0364106 A1 | 11/2020 | Chen et al. | |
| 2021/0200447 A1* | 7/2021 | Gupta | G06F 3/0635 |
| 2021/0406721 A1* | 12/2021 | Pathak | G06F 8/65 |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

(56) References Cited

OTHER PUBLICATIONS

N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
Dell EMC, "PowerMax OS," Dell EMC PowerMax Family Product Guide, May 2019, 192 pages.
Dell EMC, "Dell EMC VxRack FLEX," Dell EMC Product Overview, 2018, 5 pages.
NVM Express, "NVM Express, Revision 1.3," NVM Express, May 1, 2017, 282 pages.
U.S. Appl. No. 15/662,708 filed in the name of Xiangping Chen et al. filed Jul. 28, 2017, and entitled "Token-Based Data Flow Control in a Clustered Storage System."
U.S. Appl. No. 15/793,121 filed in the name of David Meiri et al. filed Oct. 25, 2017, and entitled "Opportunistic Compression of Replicated Data in a Content Addressable Storage System."
U.S. Appl. No. 15/824,536 filed in the name of Christopher Sayles et al. filed Nov. 28, 2017, and entitled "Storage System with Asynchronous Messaging between Processing Modules for Data Replication."
U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."
U.S. Appl. No. 16/530,121 filed in the name of Anton Kucherov et al. filed Aug. 2, 2019, and entitled "Memory-Efficient Processing of Raid Metadata Bitmaps."
U.S. Appl. No. 16/663,524 filed in the name of Xiangping Chen et al. filed Oct. 25, 2019, and entitled "Storage System with Throughput-Based Timing of Synchronous Replication Recovery."
U.S. Appl. No. 16/665,651 filed in the name of Lior Kamran et al. filed Oct. 28, 2019, and entitled "Recovery Flow with Reduced Address Lock Contention in a Content Addressable Storage System."
U.S. Appl. No. 16/671,824 filed in the name of Lior Kamran et al. filed Nov. 1, 2019, and entitled "Storage System Capacity Expansion Using Mixed-Capacity Storage Devices."
U.S. Appl. No. 16/693,858 filed in the name of Doron Tai filed Nov. 25, 2019, and entitled "Storage System with Prioritized RAID Rebuild."
U.S. Appl. No. 16/747,138 filed in the name of Lior Kamran et al. filed Jan. 20, 2020, and entitled "Performance Monitoring for Storage System with Core Thread Comprising Internal and External Schedulers."
U.S. Appl. No. 16/915,380 filed in the name of Vladimir Shveidel et al. filed Jun. 29, 2020, and entitled "End-to-End Quality of Service Mechanism for Storage System Using Prioritized Thread Queues."
U.S. Appl. No. 17/077,559 filed in the name of Vladimir Shveidel et al. filed Oct. 22, 2020, and entitled "Storage System with Adaptive Flow Control Using Multiple Feedback Loops."

* cited by examiner

DYNAMIC SLICE ASSIGNMENT IN A DISTRIBUTED STORAGE SYSTEM

FIELD

The field relates generally to information processing systems, and more particularly to storage in information processing systems.

BACKGROUND

A wide variety of different types of distributed storage systems are known. Such storage systems include clustered storage systems as well as other types of storage systems that are distributed across multiple storage nodes. Distributed storage systems can include a potentially large number of distributed storage nodes that are interconnected by a mesh network or other type of communication network. Each such storage node of a distributed storage system typically processes input-output (IO) operations from one or more host devices and in processing those IO operations runs various storage application processes that generally involve interaction of that storage node with one or more other ones of the storage nodes.

SUMMARY

Illustrative embodiments provide techniques for dynamic slice assignment in a distributed storage system. For example, dynamic slice assignment in some embodiments alters an otherwise substantially even distribution of slices of a logical address space across storage nodes of a distributed storage system, responsive to a failure or other high availability (HA) event involving at least one of the storage nodes. Such embodiments can dynamically adjust the assignment of slices of the logical address space to the storage nodes over time to take into account variations in IO processing capacities of the storage nodes.

These and other embodiments advantageously prevent one or more storage nodes that are adversely impacted by HA events from becoming processing bottlenecks for other ones of the storage nodes, thereby achieving overall improvements in the IO processing throughput of the distributed storage system.

For example, in embodiments incorporating flow control mechanisms that limit the number of IO operations that can be concurrently processed in the distributed storage system so as to meet strict maximum processing latency guarantees, dynamic slice assignment as disclosed herein can facilitate achievement of such guarantees, while also ensuring high utilization of storage node processing capacities.

In one embodiment, an apparatus comprises at least one processing device comprising a processor coupled to a memory. The at least one processing device is configured to monitor latencies associated with processing of IO operations in a plurality of storage nodes of a distributed storage system, to detect an unbalanced condition between the storage nodes based at least in part on the monitored latencies, and responsive to the detected unbalanced condition, to adjust an assignment of slices of a logical address space of the distributed storage system to the storage nodes. The at least one processing device illustratively comprises at least one processing core of a multi-core storage node of the distributed storage system, although numerous other processing device arrangements are possible.

The term "monitored latencies" as used herein is intended to be broadly construed, and in some embodiments comprises individual processing module latencies, such as separate latencies of respective routing, control and data modules in each of at least a subset of the storage nodes, and/or route latencies computed from individual latencies of routing, control and data modules used in processing a particular IO operation across multiple storage nodes. Numerous other types of latencies can be monitored in other embodiments.

In some embodiments, monitoring latencies associated with processing of IO operations in the storage nodes comprises periodically obtaining latency measurements from flow control components implemented in respective ones of the storage nodes, and computing individual latencies of the respective ones of the storage nodes and an average latency of the respective storage nodes based at least in part on the obtained latency measurements. The flow control components in some embodiments are part of an adaptive flow control mechanism of the distributed storage system, with the adaptive flow control mechanism illustratively comprising a feedback loop in which a window size defining an amount of concurrent processing of the IO operations in the distributed storage system is adjusted responsive to a measured latency in processing of one or more of the IO operations. The measured latency for processing of one or more of the IO operations illustratively comprises an average end-to-end latency measured over multiple ones of the IO operations, and the window size defines a maximum permitted amount of concurrent processing of the IO operations in the storage system in terms of a number of data units of a particular size. Other types of flow control mechanisms and associated flow control components can be used in other embodiments.

In some embodiments, detecting an unbalanced condition between the storage nodes based at least in part on the monitored latencies comprises determining if at least one of the storage nodes has a relatively high latency that deviates by more than a threshold amount from an average latency of the storage nodes.

For example, detecting an unbalanced condition between the storage nodes based at least in part on the monitored latencies can comprise detecting an unbalanced condition attributable to at least one of (a) failure and restart of at least one processing module of at least one of the storage nodes, and (b) at least one storage drive failure impacting at least one of the storage nodes. A wide variety of other types of unbalanced conditions can be similarly detected in other illustrative embodiments.

In some embodiments, adjusting an assignment of slices of the logical address space of the distributed storage system to the storage nodes responsive to the detected unbalanced condition illustratively comprises increasing a number of the slices assigned to one or more of the storage nodes having relatively low latencies and decreasing a number of slices assigned to one or more of the storage nodes having relatively high latencies.

Additionally or alternatively, adjusting an assignment of slices of the logical address space of the distributed storage system to the storage nodes responsive to the detected unbalanced condition can comprise modifying an initial assignment of the slices to the storage nodes in which the slices are evenly distributed across the storage nodes with each of the storage nodes being assigned the same number of slices.

In some embodiments, the distributed storage system comprises a plurality of storage nodes. The storage nodes of the distributed storage system are illustratively interconnected in a mesh network, although other interconnection arrangements may be used. The distributed storage system includes persistent storage illustratively comprising a first plurality of storage devices associated with the first storage node and one or more additional pluralities of storage devices associated with respective additional ones of the storage nodes. The storage devices associated with a given one of the storage nodes are illustratively implemented in a disk array enclosure or other type of storage array enclosure of the given storage node.

Each of at least a subset of the storage nodes of the distributed storage system in some embodiments illustratively comprises a set of processing modules configured to communicate with corresponding sets of processing modules on other ones of the storage nodes, with a given such set of processing modules comprising, for example, at least a routing module, a control module and a data module. The sets of processing modules of the respective storage nodes of the distributed storage system collectively comprise at least a portion of a distributed storage controller of the distributed storage system.

In such an embodiment, monitoring latencies associated with processing of IO operations in the storage nodes illustratively comprises periodically obtaining latency measurements from flow control components implemented in respective ones of the routing modules implemented in respective ones of the storage nodes.

In some embodiments, a given one of the flow control components in a corresponding one of the routing modules is configured to determine latency of its corresponding routing module, to determine latencies of each of at least a subset of the control modules, to determine latencies of each of at least a subset of the data modules, and to report the determined latencies to a system manager module implemented in at least one of the storage nodes, the system manager module processing the latencies received from the given flow control component in the corresponding one of the routing modules and latencies received from other ones of the flow control components in other ones of the routing modules to compute individual latencies of respective ones of the storage nodes and an average latency of the respective storage nodes.

The system manager module in illustrative embodiments computes an individual latency of a given one of the storage nodes by summing an average routing module latency, an average control module latency and an average data module latency for the given storage node over a particular measurement interval.

In some embodiments, adjusting an assignment of slices of the logical address space of the distributed storage system to the storage nodes responsive to the detected unbalanced condition comprises making a first adjustment by increasing a number of the slices assigned to one or more of the storage nodes having relatively low latencies and decreasing a number of slices assigned to one or more of the storage nodes having relatively high latencies, determining whether or not the unbalanced condition still exists based at least in part on continued monitoring of latencies subsequent to making the first adjustment, and responsive to the unbalanced condition still existing, making an additional adjustment by further increasing the number of the slices assigned to one or more of the storage nodes having relatively low latencies and further decreasing a number of slices assigned to one or more of the storage nodes having relatively high latencies. One or more additional iterations of the determining and if necessary one or more further iterations of making an additional adjustment are performed until it is determined that the unbalanced condition no longer exists.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
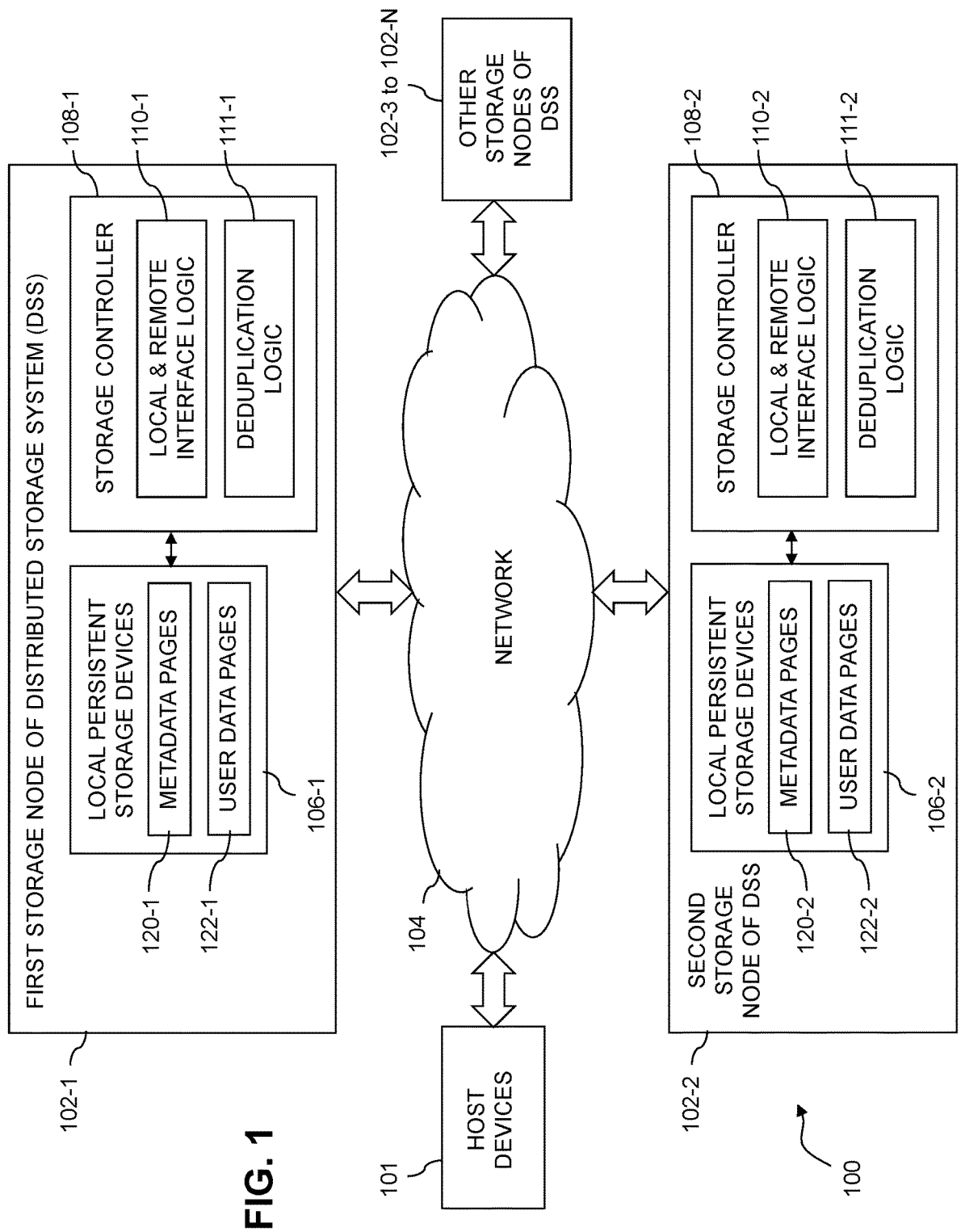
FIG. 1 is a block diagram of an information processing system comprising a distributed storage system incorporating functionality for dynamic slice assignment in an illustrative embodiment.

FIG. 1 shows an information processing system 100 configured in accordance with an illustrative embodiment. The information processing system 100 comprises a plurality of host devices 101, a first storage node 102-1, a second storage node 102-2, and a plurality of additional storage nodes 102-3 through 102-N, all of which are configured to communicate with one another over a network 104. The first and second storage nodes 102 with the additional storage nodes 102-3 through 102-N collectively form an example of what is more generally referred to herein as a "distributed storage system" or DSS. Other distributed storage systems can include different numbers and arrangements of storage nodes. For example, a distributed storage system in some embodiments may include only the first and second storage nodes 102.

Each of the storage nodes 102 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (IO) operations that are processed by a corresponding one of the storage nodes 102. The term "input-output" as used herein refers to at least one of input and output. For example, IO operations may comprise write requests and/or read requests directed to logical addresses of a particular logical storage volume of a given one of the storage nodes 102. These and other types of IO operations are also generally referred to herein as IO requests.

The IO operations that are being concurrently processed in the system in some embodiments are referred to herein as "in-flight" IOs that have been admitted by the storage nodes 102 to further processing within the system 100. The storage nodes 102 are illustratively configured to queue IO operations arriving from one or more of the host devices 101 in one or more sets of IO queues.

The storage nodes 102 illustratively comprise respective processing devices of one or more processing platforms. For example, the storage nodes 102 can each comprise one or more processing devices each having a processor and a memory, possibly implementing virtual machines and/or containers, although numerous other configurations are possible.

The storage nodes 102 can additionally or alternatively be part of cloud infrastructure such as an Amazon Web Services (AWS) system. Other examples of cloud-based systems that can be used to provide at least portions of the storage nodes 102 include Google Cloud Platform (GCP) and Microsoft Azure.

The storage nodes 102 may be implemented on a common processing platform, or on separate processing platforms.

The host devices 101 are illustratively configured to write data to and read data from the distributed storage system comprising storage nodes 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage node 102-1 comprises a plurality of storage devices 106-1 and an associated storage controller 108-1. The storage devices 106-1 store metadata pages 120-1 and user data pages 122-1 associated with one or more storage volumes of the distributed storage system. The storage volumes illustratively comprise respective logical units (LUNs) or other types of logical storage volumes. The storage devices 106-1 more particularly comprise local persistent storage devices of the first storage node 102-1. Such persistent storage devices are local to the first storage node 102-1, but remote from the second storage node 102-2 and the other storage nodes 102.

Similarly, the second storage node 102-2 comprises a plurality of storage devices 106-2 and an associated storage controller 108-2. The storage devices 106-2 store metadata pages 120-2 and user data pages 122-2 associated with one or more storage volumes of the distributed storage system, such as the above-noted LUNs. The storage devices 106-2 more particularly comprise local persistent storage devices of the second storage node 102-2. Such persistent storage devices are local to the second storage node 102-2, but remote from the first storage node 102-1 and the other storage nodes 102.

The storage controller 108-1 of first storage node 102-1 in the FIG. 1 embodiment includes local and remote interface logic 110-1 and deduplication logic 111-1. It can also include additional elements, such as journal destaging logic and other logic instances for processing IO operations, and a signature generator for generating content-based signatures of respective data pages.

Similarly, the storage controller 108-2 of second storage node 102-2 includes local and remote interface logic 110-2 and deduplication logic 111-2. The storage controller 108-2, like the storage controller 108-1, can also include additional elements, such as journal destaging logic and other logic instances for processing IO operations, and a signature generator for generating content-based signatures of respective data pages.

The instances of local and remote interface logic 110-1 and 110-2 are collectively referred to herein as local and remote interface logic 110. Such local and remote interface logic instances are also referred to herein as individually or collectively comprising distributed logic instances of the system 100.

The local and remote interface logic 110 of the storage nodes 102 controls interaction of the storage nodes 102 with local and remote storage devices 106 of the distributed storage system. The local persistent storage of a given one of the storage nodes 102 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 102 via remote interfaces. The local and remote interface logic 110 illustratively controls the manner in which the local and remote interfaces are used to access persistent storage of the given node, as will be described in more detail elsewhere herein.

For example, it is assumed in some embodiments each of the storage devices 106 on a given one of the storage nodes 102 can be accessed by the given storage node via its local interface, or by any of the other storage nodes via a remote direct memory access (RDMA) interface. A given storage application executing on the storage nodes 102 illustratively requires that all of the storage nodes 102 be able to access all of the storage devices 106. Such access to local persistent storage of each node from the other storage nodes can be performed, for example, using the RDMA interfaces with the other storage nodes, although other arrangements are possible.

The instances of deduplication logic 111-1 and 111-2 are collectively referred to herein as deduplication logic 111. Such deduplication logic instances are also referred to herein as individually or collectively comprising distributed logic instances of the system 100.

The storage controllers 108 are illustratively configured to control performance of at least a portion of a process as described herein for dynamic slice assignment using deduplication logic 111 of storage nodes 102. For example, the storage controllers 108 and their respective instances of deduplication logic 111 illustratively implement at least portions of the dynamic slice assignment process to be described below in conjunction with FIG. 4. This process is an example of an algorithm implemented by logic instances deployed within the storage controllers 108.

Each of the other storage nodes 102 of the distributed storage system of FIG. 1 is assumed to be configured in a manner similar to that described above for the first storage node 102-1 and the second storage node 102-2.

The storage controllers 108 of the storage nodes 102 may include additional modules and other components typically found in conventional implementations of storage controllers and storage systems, although such additional modules and other components are omitted from the figure for clarity and simplicity of illustration.

For example, the storage controllers 108 can comprise or be otherwise associated with one or more write caches and one or more write cache journals, both also illustratively distributed across the storage nodes 102 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 102 of the distributed storage system of FIG. 1.

In some embodiments, the storage nodes 102 of the distributed storage system collectively provide a scale-out all-flash content addressable storage array such as an XtremIO™ storage array from Dell EMC of Hopkinton, Mass. The storage nodes 102 can be used to implement other types of storage systems in other embodiments. One or more such storage nodes can be associated with at least one storage array, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage nodes 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

In some embodiments, the storage nodes 102 of the distributed storage system of FIG. 1 are connected to each other in a full mesh network, and are collectively managed by a system manager. A given set of local persistent storage devices 106 on a given one of the storage nodes 102 is illustratively implemented in a disk array enclosure (DAE) or other type of storage array enclosure of that storage node. The system manager is illustratively implemented as a management module or other similar management logic instance, possibly running on one or more of the storage nodes 102, on another storage node and/or on a separate non-storage node of the distributed storage system.

The distributed storage system of FIG. 1 implements functionality for dynamic slice assignment in the storage nodes 102, utilizing instances of local and remote interface logic 110 and deduplication logic 111 of the storage controllers 108 of respective ones of the storage nodes 102, as will now be described in more detail.

As indicated previously, the storage nodes 102 of the distributed storage system of FIG. 1 process IO operations from one or more host devices 101 and in processing those IO operations run various storage application processes that generally involve interaction of that storage node with one or more other ones of the storage nodes.

Absent use of the techniques disclosed herein, utilizing a substantially even slice assignment across all of the storage nodes 102 can under certain conditions unduly impact the processing efficiency of the storage nodes 102, leading to potentially significant degradations in the overall IO processing performance of the distributed storage system. For example, in embodiments incorporating flow control mechanisms that limit the number of IO operations that can be concurrently processed in the distributed storage system so as to meet strict maximum processing latency guarantees, a given such flow control mechanism can set the number of concurrently processed IO operations based on the worst-case latency among the storage nodes, resulting in other ones of the storage nodes being underutilized relative to their available processing capacities.

The distributed storage system of FIG. 1 and other illustrative embodiments herein advantageously overcome these and other problems arising from fixed slice assignment or other types of substantially even slice assignment approaches by implementing dynamic slice assignment within the distributed storage system. For example, the distributed storage system of FIG. 1 is illustratively configured to provide dynamic slice assignment using instances of deduplication logic 111 of respective ones of the storage nodes 102.

Dynamic slice assignment in some embodiments alters an otherwise substantially even distribution of slices of a logical address space across the storage nodes 102 of the distributed storage system, responsive to a failure or other high availability (HA) event involving at least one of the storage nodes 102. Such embodiments can dynamically adjust the assignment of slices of the logical address space to the storage nodes 102 over time to take into account variations in IO processing capacities of the storage nodes 102. In embodiments utilizing the above-noted flow control mechanisms, dynamic slice assignment as disclosed herein can facilitate achievement of strict maximum processing latency guarantees, while also ensuring high utilization of storage node processing capacities.

These and other embodiments advantageously prevent one or more of the storage nodes 102 that are adversely impacted by HA events from becoming processing bottlenecks for other ones of the storage nodes 102, thereby achieving overall improvements in the IO processing throughput of the distributed storage system.

In operation, the distributed storage system comprising storage nodes 102 implements dynamic slice assignment in the following exemplary manner.

At least one processing device of the distributed storage system comprises a processor and a memory coupled to the processor, and is configured to monitor latencies associated with processing of IO operations in the storage nodes 102 of the distributed storage system, to detect an unbalanced condition between the storage nodes 102 based at least in part on the monitored latencies, and responsive to the detected unbalanced condition, to adjust an assignment of slices of a logical address space of the distributed storage system to the storage nodes 102.

The term "monitored latencies" as used herein is intended to be broadly construed, and in some embodiments comprises individual processing module latencies, such as separate latencies of respective routing, control and data modules in each of at least a subset of the storage nodes, and/or route latencies computed from individual latencies of routing, control and data modules used in processing a particular IO operation across multiple storage nodes. Numerous other types of latencies can be monitored in other embodiments.

The "at least one processing device" referred to above illustratively comprises at least a portion of one or more of the storage nodes 102, and can include, for example, a single processing device on one of the storage nodes 102, multiple processing devices on one of the storage nodes 102, or one or more processing devices on each of one or more of the storage nodes 102, with each such processing device comprising at least one processor and at least one memory. For example, the at least one processing device can comprise at least one processing core of a multi-core storage node of the distributed storage system. Such a processing core can implement a system manager module that controls performance of the dynamic slice assignment functionality by interacting with other modules, such as routing modules, control modules and data modules, as described in more detail elsewhere herein. An example of a system manager module will be described below in conjunction with FIG. 5. The system manager module can be implemented in one of the storage nodes 102, or can be distributed as multiple system management components across multiple ones of the storage nodes 102, or can be implemented in an entirely separate management node of the distributed storage system. A wide variety of other arrangements of one or more processing devices can be configured to implement dynamic slice assignment functionality as disclosed herein.

Figure 5:
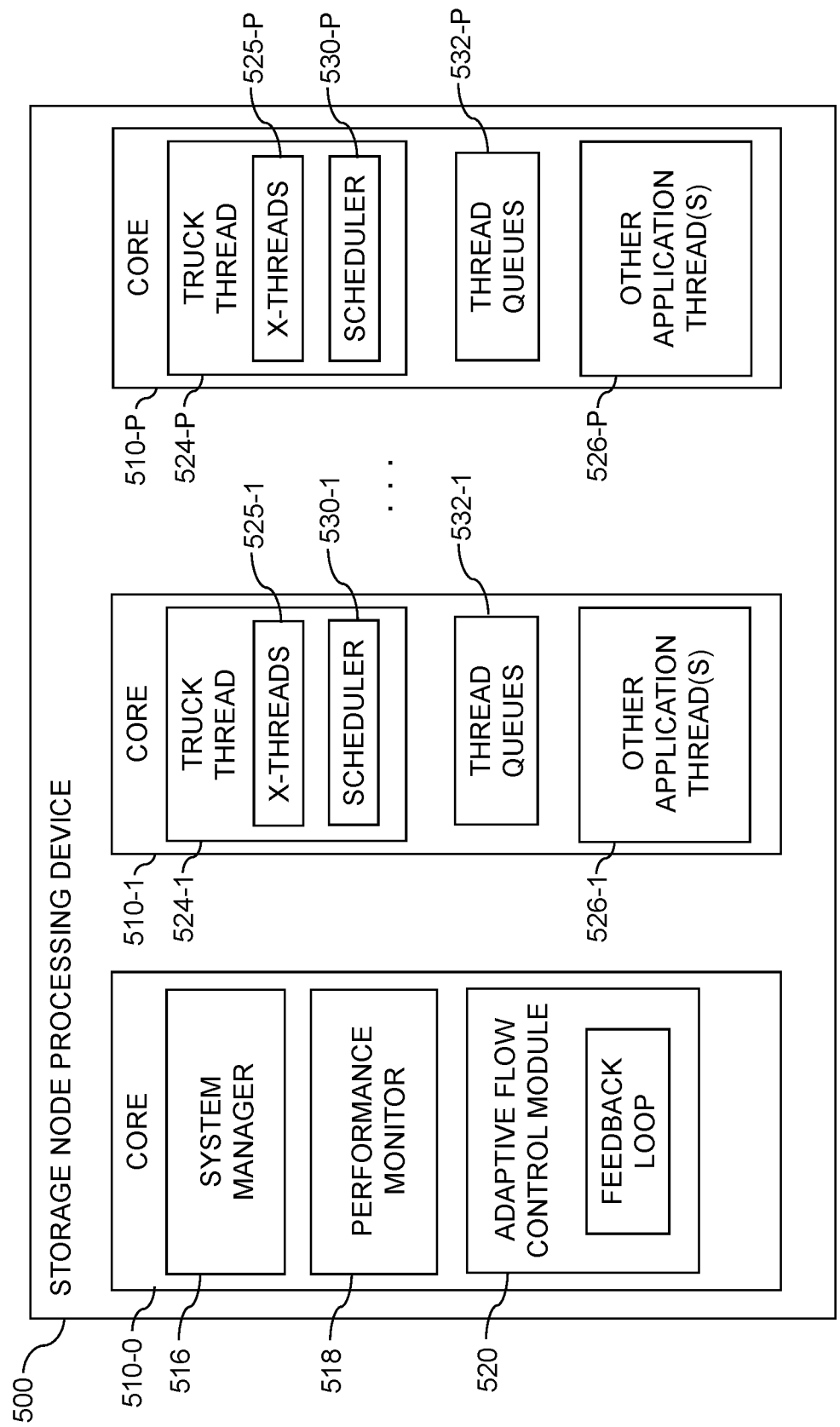
FIG. 5 is a block diagram of a processing device comprising a plurality of processing cores in a distributed storage system implementing dynamic slice assignment in an illustrative embodiment.

In some embodiments, monitoring latencies associated with processing of IO operations in the storage nodes 102 comprises periodically obtaining latency measurements from flow control components implemented in respective ones of the storage nodes 102, and computing individual latencies of the respective ones of the storage nodes 102 and an average latency of the respective storage nodes 102 based at least in part on the obtained latency measurements. The flow control components are illustratively part of an adaptive flow control mechanism of the distributed storage system. Such an adaptive flow control mechanism, an example of which is also shown in FIG. 5, comprises a feedback loop in which a window size defining an amount of concurrent processing of the IO operations in the distributed storage system is adjusted responsive to a measured latency in processing of one or more of the IO operations. The measured latency for processing of one or more of the IO operations may comprise, for example, an average end-to-end latency measured over multiple ones of the IO operations. The window size is illustratively configured to define a maximum permitted amount of concurrent processing of the IO operations in the storage system in terms of a number of data units of a particular size. It is to be appreciated, however, that other types of flow control mechanisms implementing different types of feedback can be used in other embodiments.

In some embodiments, detecting an unbalanced condition between the storage nodes 102 based at least in part on the monitored latencies comprises determining if at least one of the storage nodes 102 has a relatively high latency that deviates by more than a threshold amount from an average latency of the storage nodes 102.

Such an unbalanced condition detected between the storage nodes 102 can be attributable to a wide variety of different factors, including by way of example failure and restart of at least one processing module of at least one of the storage nodes 102, and/or at least one storage drive failure impacting at least one of the storage nodes 102.

Adjusting an assignment of slices of the logical address space of the distributed storage system to the storage nodes 102 responsive to the detected unbalanced condition illustratively comprises increasing a number of the slices assigned to one or more of the storage nodes 102 having relatively low latencies and decreasing a number of slices assigned to one or more of the storage nodes 102 having relatively high latencies.

Additionally or alternatively, adjusting an assignment of slices of the logical address space of the distributed storage system to the storage nodes 102 responsive to the detected unbalanced condition illustratively comprises modifying an initial assignment of the slices to the storage nodes 102 in which the slices are evenly distributed across the storage nodes 102 with each of the storage nodes 102 being assigned the same number of slices.

In some embodiments, each of at least a subset of the storage nodes 102 of the distributed storage system comprises a set of processing modules configured to communicate with corresponding sets of processing modules on other ones of the storage nodes 102. A given such set of processing modules illustratively comprises at least a routing module, a control module and a data module, with the sets of processing modules of the storage nodes of the distributed storage system collectively comprising at least a portion of a distributed storage controller of the distributed storage system. Examples of such sets of processing modules are described in more detail below in conjunction with FIGS. 2 and 3.

For embodiments including control modules of the type noted above, adjusting an assignment of slices of the logical address space of the distributed storage system to the storage nodes 102 responsive to the detected unbalanced condition illustratively comprises increasing a number of the slices assigned to control modules of one or more of the storage nodes 102 having relatively low latencies and decreasing a number of slices assigned to control modules of one or more of the storage nodes 102 having relatively high latencies.

Additionally or alternatively, adjusting an assignment of slices of the logical address space of the distributed storage system to the storage nodes 102 responsive to the detected unbalanced condition illustratively comprises modifying an initial assignment of the slices to the control modules of the storage nodes 102 in which the slices are evenly distributed across the control modules of the storage nodes 102 with each of the control modules of the storage nodes 102 being assigned the same number of slices.

In some embodiments, monitoring latencies associated with processing of IO operations in the storage nodes 102 comprises periodically obtaining latency measurements from flow control components implemented in respective ones of the routing modules implemented in respective ones of the storage nodes 102.

For example, a given one of the flow control components in a corresponding one of the routing modules is illustratively configured to determine latency of its corresponding routing module, to determine latencies of each of at least a subset of the control modules, to determine latencies of each of at least a subset of the data modules, and to report the determined latencies to a system manager module implemented in at least one of the storage nodes 102. The system manager module illustratively processes the latencies received from the given flow control component in the corresponding one of the routing modules and latencies received from other ones of the flow control components in other ones of the routing modules to compute individual latencies of respective ones of the storage nodes 102 and an average latency of the respective storage nodes 102.

In some embodiments, the system manager module computes an individual latency of a given one of the storage nodes 102 by summing an average routing module latency, an average control module latency and an average data module latency for the given storage node over a particular measurement interval. Other examples of functionality of the system manager module will be described elsewhere herein.

In some embodiments, adjusting an assignment of slices of the logical address space of the distributed storage system to the storage nodes 102 responsive to the detected unbalanced condition illustratively comprises making a first adjustment by increasing a number of the slices assigned to one or more of the storage nodes 102 having relatively low latencies and decreasing a number of slices assigned to one or more of the storage nodes 102 having relatively high latencies, determining whether or not the unbalanced condition still exists based at least in part on continued monitoring of latencies subsequent to making the first adjustment, and responsive to the unbalanced condition still existing, making an additional adjustment by further increasing the number of the slices assigned to one or more of the storage nodes 102 having relatively low latencies and further decreasing a number of slices assigned to one or more of the storage nodes 102 having relatively high latencies. One or more additional iterations of the determining and if necessary one or more further iterations of making an additional adjustment are performed until it is determined that the unbalanced condition no longer exists.

It is assumed in some embodiments that each of the storage nodes 102 incorporates substantially the same functionality for dynamic slice assignment using its corresponding instance of the deduplication logic 111.

Such dynamic slice assignment functionality in the distributed storage system of FIG. 1 is illustratively implemented at least in part by or under the control of the instances of deduplication logic 111 operating in cooperation with the instances of local and remote interface logic 110 in the storage controllers 108 of the respective first and second storage nodes 102. The other storage nodes 102 of the distributed storage system of FIG. 1 are assumed to operate in a manner similar to that described above for the first and second storage nodes 102.

These and other features of illustrative embodiments disclosed herein are examples only, and should not be construed as limiting in any way. Other types of dynamic slice assignment may be used in other embodiments, and the term "dynamic slice assignment" as used herein is intended to be broadly construed.

An additional example of an illustrative process for dynamic slice assignment implementing at least some of the above-described functionality will be provided below in conjunction with the flow diagram of FIG. 4.

The storage nodes 102 collectively comprise an example of a distributed storage system. The term "distributed storage system" as used herein is intended to be broadly construed, so as to encompass, for example, clustered storage systems or other types of storage systems distributed over multiple storage nodes.

The storage nodes 102 in some embodiments are part of a distributed content addressable storage system in which logical addresses of data pages are mapped to physical addresses of the data pages in the storage devices 106 using respective content-based signatures that are generated from those data pages, as will now be described in more detail with reference to the illustrative embodiments of FIGS. 2 and 3.

Figure 2:
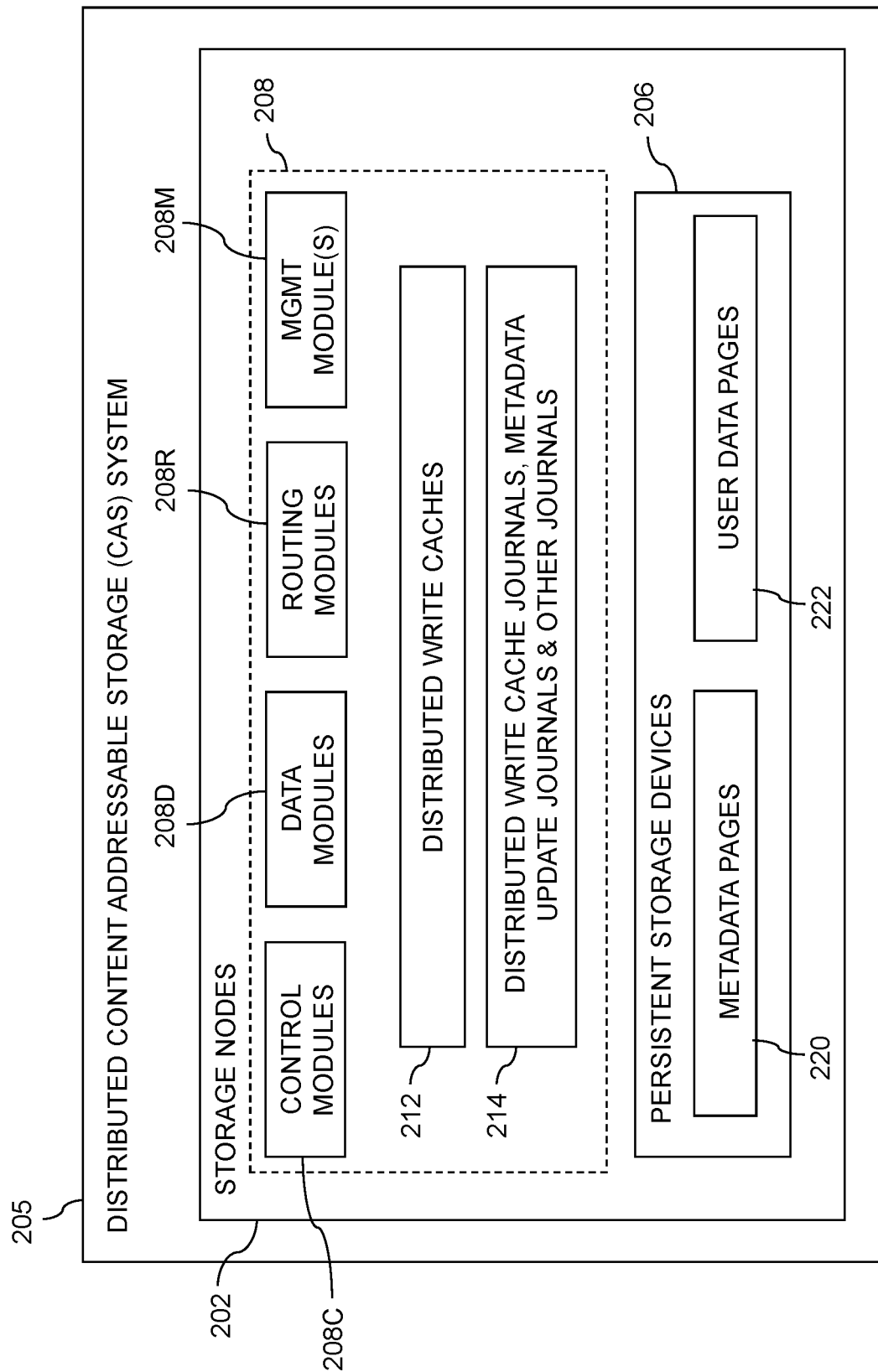
FIG. 2 shows an example of a distributed content addressable storage (CAS) system that illustratively represents one possible implementation of a distributed storage system in some embodiments.

FIG. 2 shows an example of a distributed content addressable storage (CAS) system 205 that illustratively represents a particular example implementation of the distributed storage system comprising the storage nodes 102 of FIG. 1. The distributed CAS system 205 is therefore assumed to be coupled to one or more host devices 101 of a computer system within information processing system 100.

The CAS system 205 comprises a plurality of persistent storage devices 206 and an associated storage controller 208. The storage devices 206 store data of a plurality of storage volumes. The storage volumes illustratively comprise respective LUNs or other types of logical storage volumes. The stored data comprises metadata pages 220 and user data pages 222, both described in more detail elsewhere herein. The storage devices 206 and storage controller 208 are distributed across multiple storage nodes 202. The CAS system 205 can include additional components, such as local and remote interface logic and destaging logic, each also illustratively distributed across the storage nodes 202 of the CAS system 205.

The CAS system 205 is illustratively implemented as a distributed storage system, also referred to herein as a clustered storage system, in which each of at least a subset of the storage nodes 202 comprises a set of processing modules configured to communicate with corresponding sets of processing modules on other ones of the storage nodes 202. The sets of processing modules of the storage nodes of the CAS system 205 collectively comprise at least a portion of the storage controller 208 of the CAS system 205. For example, in some embodiments the sets of processing modules of the storage nodes collectively comprise a distributed storage controller of the CAS system 205. A "distributed storage system" as that term is broadly used herein is intended to encompass any storage system that, like the CAS system 205, is distributed across multiple storage nodes.

Although it is assumed that both the first storage node 102-1 and the second storage node 102-2 are part of a single content addressable storage system in some embodiments, other types of storage systems can be used for one or both of the first storage node 102-1 and the second storage node 102-2 in other embodiments. For example, it is possible that at least one of the storage nodes 102 in an illustrative embodiment need not be a storage node of a content addressable storage system and such a storage node need not include an ability to generate content-based signatures. In an embodiment of this type, the signature generation functionality can be implemented in a host device.

The storage controller 208 in the present embodiment is configured to implement functionality for dynamic slice assignment in a distributed storage system of the type previously described in conjunction with FIG. 1.

The storage controller 208 includes distributed write caches 212 and a set of distributed journals 214. The set of distributed journals 214 illustratively comprises a write cache journal, a metadata update journal and possibly one or more other journals. The distributed write caches 212 and the set of distributed journals 214 each illustratively have respective instances thereof on each of the storage nodes 202.

Additional modules that are assumed to be implemented in the storage controller 208 but are not explicitly shown in the figure include, for example, distributed instances of local and remote interface logic 110 and deduplication logic 111, with respective different instances thereof being implemented on respective ones of the storage nodes 202. Each of the storage nodes 202 of the CAS system 205 is assumed to be implemented using at least one processing device comprising a processor coupled to a memory.

In the CAS system 205, logical addresses of data pages are mapped to physical addresses of the data pages using respective content-based signatures that are generated from those data pages. The data pages illustratively include user data pages 222. Metadata pages 220 are typically handled in a different manner, as will be described.

The term "page" as used in this and other contexts herein is intended to be broadly construed so as to encompass any of a wide variety of different types of blocks that may be utilized in a block storage device of a storage system. Different native page sizes are generally utilized in different storage systems of different types. For example, XtremIO™ X1 storage arrays utilize a native page size of 8 kilobytes (KB), while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing data pages of the CAS system 205.

Also, the term "storage volume" as used herein is intended to be broadly construed, and should not be viewed as being limited to any particular format or configuration.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

As indicated above, the storage controller 208 in this embodiment is implemented as a distributed storage controller that comprises sets of processing modules distributed over the storage nodes 202. The storage controller 208 is therefore an example of what is more generally referred to herein as a distributed storage controller.

It is assumed in some embodiments that the processing modules of the storage controller 208 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage controller 208 illustratively comprise control modules 208C, data modules 208D, routing modules 208R and at least one management module 208M. Again, these and possibly other processing modules of the storage controller 208 are illustratively interconnected with one another in the full mesh network, such that each of the modules can communicate with each of the other modules, although other types of networks and different module interconnection arrangements can be used in other embodiments.

The management module 208M of the distributed storage controller in this embodiment may more particularly comprise a system-wide management module, also referred to herein as a system manager. Other embodiments can include multiple instances of the management module 208M implemented on different ones of the storage nodes 202. It is therefore assumed that the storage controller 208 comprises one or more management modules 208M.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The processing modules of the storage controller 208 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table illustratively comprises a plurality of entries accessible utilizing logical addresses as respective keys, with each such entry of the A2H table comprising a corresponding one of the logical addresses, a corresponding one of the hash handles, and possibly one or more additional fields. In some embodiments, the A2H table is assumed to comprise full hash digests in place of or in addition to hash handles. Other configurations are possible, and the term "address-to-hash table" as used herein is therefore intended to be broadly construed.

2. A hash-to-data ("H2D") table. The H2D table illustratively comprises a plurality of entries accessible utilizing hash handles as respective keys, with each such entry of the H2D table comprising a corresponding one of the hash handles, a physical offset of a corresponding one of the data pages, and possibly one or more additional fields. Again, full hash digests can be used in place of or in addition to hash handles.

3. A hash metadata ("HMD") table. The HMD table illustratively comprises a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table. The PLB table illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length. Hash digests can be used in place of or in addition to hash handles in some embodiments.

Again, the logical layer and physical layer mapping tables referred to above are examples only, and can be varied in other embodiments. For example, other types of hash-to-physical ("H2P") mapping tables may be used in addition to or in place of the above-noted H2D, HMD and/or PLB tables.

In some embodiments, certain ones of the above-described mapping tables are maintained by particular modules of storage controller 208. For example, the mapping tables maintained by the control modules 208C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The control modules 208C may further comprise additional components such as respective messaging interfaces that are utilized by the control modules 208C to process routing-to-control messages received from the routing modules 208R, and to generate control-to-routing messages for transmission to the routing modules 208R. Such messaging interfaces can also be configured to process instructions and other messages received from the management module 208M and to generate messages for transmission to the management module 208M.

The data modules 208D comprise respective control interfaces. These control interfaces support communication between the data modules 208D and the control modules 208C. Also included in the data modules are respective SSD interfaces. These SSD interfaces support communications with corresponding ones of the storage devices 206 of the CAS system 205.

The above-described processing module arrangements are presented by way of example only, and can be varied in other embodiments.

In some embodiments, a given data path of the CAS system 205 comprises a particular one of the routing modules 208R, a particular one of the control modules 208C and a particular one of the data modules 208D, each configured to handle different stages of the data path. For example, a given IO request can comprise a read request or a write request received in the particular control module from the particular routing module. The particular control module processes the received IO request to determine the particular data module that has access to the one or more data pages targeted by that IO request.

Communication links may be established between the various processing modules of the storage controller 208 using well-known communication protocols such as TCP/IP and RDMA. For example, respective sets of IP links used in data transfer and corresponding messaging could be associated with respective different ones of the routing modules 208R.

In some embodiments, at least portions of the functionality for dynamic slice assignment in the CAS system are distributed over at least the control modules 208C and data modules 208D of storage controller 208. Numerous other arrangements are possible. For example, portions of the functionality can be implemented in the one or more management modules 208, or using other types and arrangements of modules within or outside of the storage controller 208.

As indicated previously, the storage devices 206 are configured to store metadata pages 220 and user data pages 222, and one or more of the journals in the set of distributed journals 214, and may also store additional information not explicitly shown such as, for example, one or more system checkpoints and/or snapshots of storage volumes. The metadata pages 220 and the user data pages 222 in some embodiments are illustratively stored in respective designated metadata and user data areas of the storage devices 206. Accordingly, metadata pages 220 and user data pages 222 may be viewed as corresponding to respective designated metadata and user data areas of the storage devices 206.

As noted above, a given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 220 and the user data pages 222.

The user data pages 222 are part of a plurality of logical storage volumes configured to store files, blocks, objects or other arrangements of data, each also generally referred to herein as a "data item," on behalf of users of the CAS system 205. Each such logical storage volume may comprise particular ones of the above-noted user data pages 222 of the user data area. The user data stored in the user data pages 222 can include any type of user data that may be utilized in the system 100. The term "user data" herein is therefore also intended to be broadly construed.

A given storage volume for which content-based signatures are generated, illustratively by signature generators implemented in respective ones of the control modules 208C and/or elsewhere in the storage nodes 202, can comprise a set of one or more LUNs, each including multiple ones of the user data pages 222 stored in storage devices 206.

The CAS system 205 in the embodiment of FIG. 2 is configured to generate hash metadata providing a mapping between content-based digests of respective ones of the user data pages 222 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 222. The hash metadata generated by the CAS system 205 is illustratively stored as metadata pages 220 in the metadata area. The generation and storage of the hash metadata is assumed to be performed under the control of the storage controller 208.

Each of the metadata pages 220 characterizes a plurality of the user data pages 222. For example, in a given set of user data pages representing a portion of the user data pages 222, each of the user data pages is characterized by a volume identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 206.

Each of the metadata pages 220 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 220 in an illustrative embodiment comprises metadata pages having respective signatures. Each such metadata page characterizes a different set of user data pages. For example, the characterizing information in each metadata page can include the volume identifiers, offsets and content-based signatures for each of the user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 205 is illustratively distributed among the control modules 208C.

The functionality for dynamic slice assignment in the CAS system 205 in this embodiment is assumed to be distributed across multiple distributed processing modules, including at least a subset of the processing modules 208C, 208D, 208R and 208M of the storage controller 208.

For example, the management module 208M of the storage controller 208 may include a deduplication logic instance that engages corresponding deduplication logic instances in all of the control modules 208C in order to support dynamic slice assignment in the CAS system 205.

In some embodiments, each of the user data pages 222 has a fixed size such as, for example, 8 KB, and its content-based signature is a 20-byte signature generated using the SHA1 secure hashing algorithm. Also, each page has a volume identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The storage controller 208 in this example is configured to group consecutive pages into page groups, to arrange the page groups into slices, and to assign the slices to different ones of the control modules 208C. For example, if there are 1024 slices distributed evenly across the control modules 208C, and there are a total of 16 control modules in a given implementation, each of the control modules "owns" 1024/16=64 slices. In such arrangements, different ones of the slices are assigned to different ones of the control modules 208C such that control of the slices within the storage controller 208 of the CAS system 205 is substantially evenly distributed over the control modules 208C of the storage controller 208.

The data modules 208D allow a user to locate a given user data page based on its signature. Each metadata page also has a size of 8 KB and includes multiple instances of the <lun_id, offset, signature> for respective ones of a plurality of the user data pages 222. Such metadata pages 220 are illustratively generated by the control modules 208C but are accessed using the data modules 208D based on a metadata page signature.

The metadata page signature in this embodiment is a 20-byte signature but is not based on the content of the metadata page. Instead, the metadata page signature is generated based on an 8-byte metadata page identifier that is a function of the volume identifier and offset information of that metadata page.

If a user wants to read a user data page having a particular volume identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 205 each illustratively comprise one or more IO operations directing that at least one data item of the CAS system 205 be written to in a particular manner. A given write request is illustratively received in the CAS system 205 from one of the host devices 101 over network 104. In some embodiments, a write request is received in the storage controller 208 of the CAS system 205, and directed from one processing module to another processing module of the storage controller 208. For example, a received write request may be directed from a routing module 208R of the storage controller 208 to a particular control module 208C of the storage controller 208. Other arrangements for receiving and processing write requests from one or more of the host devices 101 can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 208C, data modules 208D and routing modules 208R of the storage nodes 202 communicate with one another over a high-speed internal network such as an InfiniBand network. The control modules 208C, data modules 208D and routing modules 208R coordinate with one another to accomplish various IO processing tasks, as described elsewhere herein.

The write requests from the host devices identify particular data pages to be written in the CAS system 205 by their corresponding logical addresses each illustratively comprising a volume identifier and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The CAS system 205 illustratively utilizes a two-level mapping process to map logical block addresses to physical block addresses. In some embodiments, the first level of mapping uses an A2H table and the second level of mapping uses an HMD table, with the A2H and HMD tables corresponding to respective logical and physical layers of the content-based signature mapping within the CAS system 205. The HMD table or a given portion thereof in some embodiments disclosed herein is more particularly referred to as an H2D table or H2P table, although it is to be understood that these and other mapping tables or other metadata structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 206. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 208C, while the HMD and PLB tables are utilized primarily by the data modules 208D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 205. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 205 correspond to respective physical blocks of a physical layer of the CAS system 205. The user data pages of the logical layer are organized by LBA and have reference via respective content-based signatures to particular physical blocks of the physical layer.

Each of the physical blocks has an associated reference count that is maintained within the CAS system 205. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 208C, 208D, 208R and 208M as shown in the FIG. 2 embodiment is presented by way of example only. Numerous alternative arrangements of processing modules of a distributed storage controller may be used to implement dynamic slice assignment in a distributed CAS system or other type of distributed storage system in other embodiments.

Additional examples of content addressable storage functionality that may be implemented in some embodiments by control modules 208C, data modules 208D, routing modules 208R and management module(s) 208M of storage controller 208 can be found in U.S. Pat. No. 9,104,326, entitled "Scalable Block Data Storage Using Content Addressing," which is incorporated by reference herein. Alternative arrangements of these and other storage node processing modules of a distributed storage controller in a distributed CAS system or other type of distributed storage system can be used in other embodiments.

As indicated above, the CAS system 205 illustratively comprises storage nodes 202 interconnected in a mesh network, with each such storage node comprising a set of processing modules configured to communicate with corresponding sets of processing modules on other ones of the storage nodes. A given such set of processing modules comprises at least a routing module, a control module and a data module, with the sets of processing modules of the storage nodes 202 of the CAS system 205 collectively comprising at least a portion of the storage controller 208 of the CAS system 205.

The storage nodes 202 and their respective sets of processing modules are managed by a system manager, illustratively implemented as a management module 208M within the set of processing modules on at least one of the storage nodes 202. Each of the storage nodes 202 illustratively comprises a CPU or other type of processor, a memory, a network interface card (NIC) or other type of network interface, and a subset of the storage devices 206, possibly arranged as part of a DAE of the storage node. These and other references to "disks" herein are intended to refer generally to storage devices, including SSDs, and should therefore not be viewed as limited in any way to spinning magnetic media.

An example of the operation of the CAS system 205 in processing IO operations will now be described with reference to FIG. 3, which shows the relationship between routing, control and data modules of one possible distributed implementation of CAS system 205 in an illustrative embodiment. More particularly, FIG. 3 illustrates a portion 300 of the CAS system 205, showing a routing module 208R-x, a control module 208C-y and a data module 208D-z in a distributed implementation of the storage controller 208. The routing module 208R-x, the control module 208C-y and the data module 208D-z are also denoted in this embodiment as an R module, a C module and a D module, respectively.

These modules are respective processing modules of the storage controller 208, and are potentially located on different ones of the storage nodes 202 of the CAS system 205. For example, each of the storage nodes 202 of the CAS system 205 illustratively comprises at least one R module, at least one C module and at least one D module, although many other storage node configurations are possible. In the present embodiment, the routing module 208R-x, the control module 208C-y and the data module 208D-z are assumed to be on respective different storage nodes x, y and z of the CAS system 205. The storage nodes x, y and z represent respective particular ones of the storage nodes 202. The storage node z that implements the D module 208D-z comprises a subset of the storage devices 206 of the CAS system 205, with the subset of storage devices 206 on storage node z being denoted as storage devices 206-z. Each of the other storage nodes 202 of the CAS system 205 similarly has a different subset of the storage devices 206 associated therewith.

It is assumed in this example that the CAS system 205 manages data using a fixed-size page granularity (e.g., 4 KB, 8 KB or 16 KB), also referred to herein as the native page size of the CAS system 205. A unique hash digest is computed for each of the data pages by a content-based signature generator, illustratively using SHA1 or another secure hashing algorithm of the type described elsewhere herein.

In the CAS system 205, routing modules 208R such as R module 208R-x illustratively include a storage command parser as shown, such as a SCSI command parser, although other command parsers for other storage protocols can be used in other embodiments. The routing modules 208R receive IO requests from one or more of the host devices 101, parse the corresponding storage commands and route them to the appropriate control modules 208C, which may be located on different storage nodes 202, illustratively using an address-to-control ("A2C") table. The A2C table maps different portions of a logical address space of the CAS system 205 across different ones of the control modules 208C. A given IO request can be sent by the corresponding one of the host devices 101 to any of the routing modules 208R of the CAS system 205.

The control modules 208C such as control module 208C-y receive the IO requests from the routing modules 208R, and use mapping tables such as the above-described A2H and H2D tables to identify the appropriate data modules 208D that store the corresponding data pages in the distributed CAS system 205. This illustratively includes performing a logical address to hash mapping as shown in the figure.

In processing read requests, the C module 208C-y retrieves from the A2H table the hash digests of the corresponding requested pages, and sends read requests to the appropriate data modules 208D based on the H2D table.

In processing write requests, the C module 208C-y illustratively computes the hash digests of the data pages based on the write data, sends write requests to the corresponding data modules 208D as determined from the H2D table, and updates the A2H table.

The data modules 208D such as D module 208D-z are responsible for the physical storage of the data pages, and use mapping tables such as the above-described HMD and PLB tables and/or other types of H2P tables to determine the physical location of a given data page in the subset of storage devices 206 associated with that data module, using a hash digest, hash handle or other content-based signature supplied by a control module. This illustratively includes performing a hash to physical location mapping as shown in the figure. Such a hash to physical location mapping can utilize an H2P table of the type described elsewhere herein, illustratively comprising at least portions of the above-noted HMD and PLB tables. The data modules 208D in some embodiments additionally store a copy or "mirror" of such metadata in a memory of the respective corresponding storage nodes 202, in order to optimize performance by reducing accesses to the associated storage devices 206 during system operation.

A given one of the host devices 101 illustratively sends an IO request to a particular one of the routing modules 208R, possibly using random selection or another type of algorithm such as round robin to select a particular routing module for a particular IO request. Such selection can be implemented as part of a path selection algorithm performed by a multi-path input-output (MPIO) driver of the host device, in order to select a particular path comprising an initiator-target pair for delivery of the IO request to the CAS system 205. The initiator illustratively comprises a particular host bus adaptor (HBA) of the given host device, and the target illustratively comprises a particular port of the CAS system 205.

The processing of write requests in the CAS system 205 makes use of the distributed write caches 212 and the distributed write cache journals of the set of distributed journals 214. Each of the write caches 212 illustratively comprises a volatile memory of the CAS system 205 for temporarily storing data pages associated with write requests received from the host devices 101. The write caches 212 are backed up by corresponding write cache journals that store persisted copies of the write data. The write data of the write caches 212 is later "destaged" to persistent data storage locations in the storage devices 206.

The above-described deduplication mechanisms of the CAS system 205 are illustratively applied to storage volumes with relatively high potential deduplicability, while storage volumes with relatively low potential deduplicability are not subject to deduplication in the CAS system 205, as will be described in more detail below. Accordingly, the CAS system 205 is an example of a single distributed storage system that is configured to store non-deduplicated data efficiently while also using deduplication mechanisms of the distributed storage system for storing deduplicated data.

The CAS system 205 is therefore advantageously configured to provide dynamic slice assignment in the storage nodes 202 using operations similar to those previously described in conjunction with FIG. 1.

These and other operations associated with dynamic slice assignment in the CAS system 205 are illustratively performed at least in part by or under the control of the storage controller 208 and at least a subset of its processing modules 208C, 208D, 208R and 208M.

The particular features described above in conjunction with FIGS. 1, 2 and 3 should not be construed as limiting in any way, and a wide variety of other distributed implementations of storage nodes 102 or 202 are possible.

Figure 3:
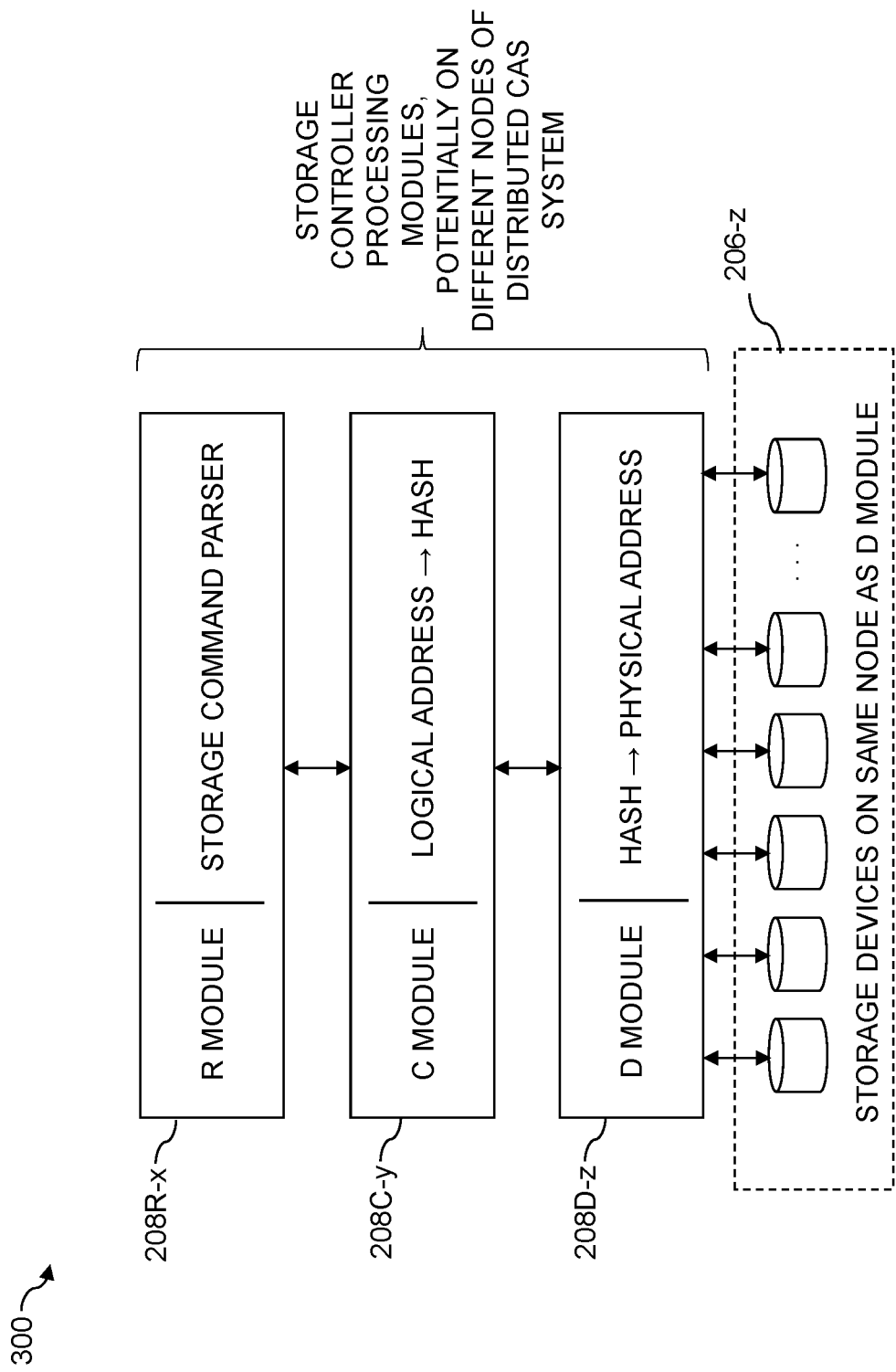
FIG. 3 shows an example relationship between routing, control and data modules of the distributed CAS system of FIG. 2 in an illustrative embodiment.

The particular sets of storage nodes 102 or 202 of the respective example distributed storage systems illustrated in FIGS. 1, 2 and 3 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes may be implemented on respective distinct processing platforms, although numerous other arrangements are possible. At least portions of their associated host devices may be implemented on the same processing platforms as the storage nodes or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage nodes 102 to reside in different data centers. Numerous other distributed implementations of the storage nodes 102 and their respective associated sets of host devices are possible. Similarly, various distributed implementations of CAS system 205 and its storage nodes 202 are possible.

Additional examples of processing platforms utilized to implement storage systems and possibly their associated host devices in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 101, storage nodes 102 or 202, network 104, storage devices 106 or 206, storage controllers 108 or 208, local and remote interface logic 110 and deduplication logic 111 can be used in other embodiments.

It should be understood that the particular sets of modules and other components implemented in a distributed storage system as illustrated in FIGS. 1, 2 and 3 are presented by way of example only. In other embodiments, only subsets of these components, or additional or alternative sets of components, may be used, and such components may exhibit alternative functionality and configurations.

For example, in other embodiments, functionality for dynamic slice assignment can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 4, which implements a process for dynamic slice assignment in a distributed storage system. This process may be viewed as an example algorithm implemented at least in part by the storage controllers 108 of the respective storage nodes 102 of the distributed storage system of FIG. 1. For example, such an algorithm is illustratively carried out at least in part utilizing one or more instances of deduplication logic 111 in respective ones of the storage controllers 108. Such an algorithm can also be implemented by the distributed storage controller 208 and its processing modules 208C, 208D, 208R and 208M distributed over the storage nodes 202 of CAS system 205 of FIG. 2. These and other algorithms disclosed herein are more generally applicable to a wide variety of other distributed storage systems each comprising two or more storage nodes.

Figure 4:
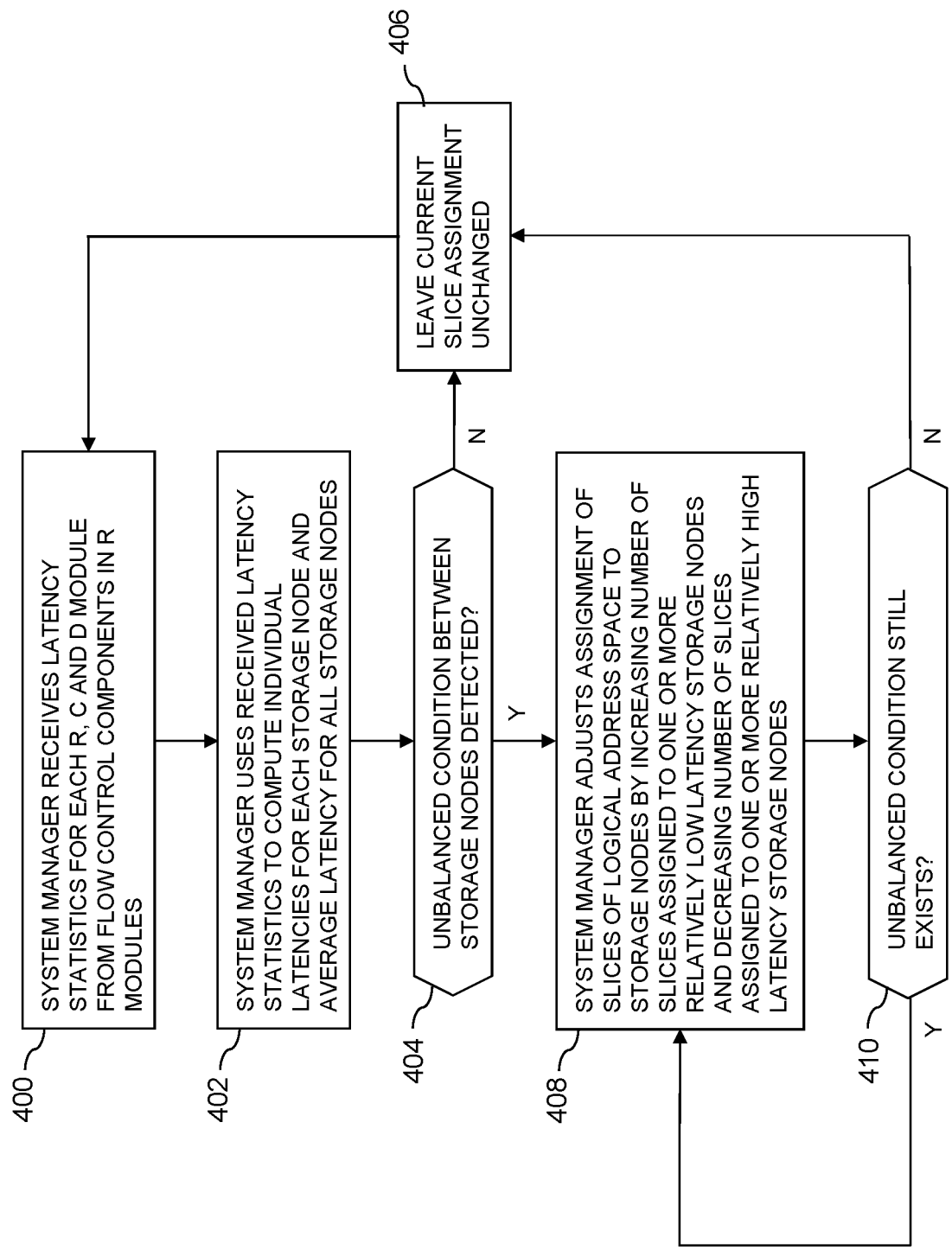
FIG. 4 is a flow diagram of an example dynamic slice assignment process in an illustrative embodiment.

Referring now to FIG. 4, the dynamic slice assignment process as illustrated includes steps 400 through 410, and implements dynamic slice assignment across multiple storage nodes of a distributed storage system. It is assumed that the steps of the process are configured to provide dynamic slice assignment for at least the storage nodes 102 of FIG. 1, or for the storage nodes 202 of FIG. 2. The steps are illustratively performed by what is generally referred to herein as a "system manager" of the distributed storage system. Such a system manager is assumed to be implemented by at least one processing device of the distributed storage system, illustratively on one or more of the storage nodes 102 or 202.

In step 400, the system manager receives latency statistics for each R, C and D module of the distributed storage system, illustratively from flow control components implemented in the R modules. Numerous alternative arrangements are possible. For example, the latency statistics in some embodiments may be received from only a subset of the R, C and D modules, and such latency statistics may be received or otherwise collected by the system manager using other techniques.

In step 402, the system manager uses the received latency statistics to compute individual latencies for each storage node and average latency for all of the storage nodes.

In step 404, a determination is made as to whether or not there is an unbalanced condition between the storage nodes has been detected. If an unbalanced condition has not been detected, the process moves to step 406, and otherwise moves to step 408 as indicated.

In step 406, a current slice assignment is left unchanged. In an initial pass through the steps of the FIG. 4 process, the current slice assignment is illustratively an initial assignment of the slices of a logical address space of the distributed storage system to the storage nodes, in which the slices are evenly distributed across the storage nodes with each of the storage nodes being assigned the same number of slices. Other types of initial assignments of slices to the storage nodes can be used.

In step 408, which is reached responsive to detection of an unbalanced condition between the storage nodes in step 404, the system manager adjusts assignment of the slices of the logical address space to the storage nodes by increasing the number of slices assigned to one or more relatively low latency storage nodes and decreasing the number of slices assigned to one or more relatively high latency storage nodes.

In step 410, a determination is made as to whether or not the unbalanced condition between the storage nodes as previously detected in step 404 continues to exist. Such a determination is illustratively based at least in part on additional latency monitoring performed by the system manager subsequent to the adjustment in slice assignment of step 408, although such additional latency monitoring is not explicitly shown in the figure. If the unbalanced condition continues to exist, the process returns to step 408, and otherwise moves to step 406 as indicated. In the return to step 408, a further adjustment in the slice assignment is made, as part of a continued attempt to alleviate the unbalanced condition between the storage nodes. In the return to step 406, the current slice assignment refers to the latest adjusted slice assignment implemented in the last iteration of step 408. Accordingly, the adjustment of slice assignment in step 408 and the determination in step 410 can be repeated over multiple iterations until such time that the system manager determines that the previously-detected unbalanced condition between the storage nodes has been sufficiently abated. It is also possible in some embodiments that the system manager may at that time execute a return to the initial slice assignment, instead of maintaining a most recent adjusted slice assignment.

The steps are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 4 is presented by way of illustrative example only, and should not be construed as limiting the scope of the disclosure in any way. Alternative embodiments can use other types of processing operations for dynamic slice assignment in a distributed storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different dynamic slice assignment processes for respective different distributed storage systems or portions thereof within a given information processing system.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A distributed storage controller as disclosed herein is illustratively configured to implement functionality for dynamic slice assignment, such as an algorithm comprising a process of the type shown in FIG. 4. Such a distributed storage controller can comprise, for example, storage controllers 108-1 and 108-2 of FIG. 1 or distributed storage controller 208 in CAS system 205, as configured to perform the steps of the process of FIG. 4.

A distributed storage controller can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, distributed storage controllers and other system components may be implemented at least in part using processing devices of such processing platforms. For example, respective distributed modules of a distributed storage controller can be implemented in respective containers running on respective ones of the processing devices of a processing platform.

Additional examples of dynamic slice assignment of the type described in conjunction with the process of FIG. 4 will now be described. As in other description herein, references below to a "disk" or "disks" in the examples to be described are intended to refer generally to storage devices, including SSDs, and should therefore not be viewed as limited in any way to spinning magnetic media, or any other particular type of storage media.

It is assumed for portions of the following description of illustrative embodiments that the page size is 16 KB and storage volumes are broken into 4 MB segments of 256 pages each, with such segments also being referred to herein as sub-LUNs. Other values for page and segment sizes can be used in other embodiments.

In some embodiments, it is further assumed that the distributed storage system comprises R modules, C modules and D modules, as described elsewhere herein. In the context of the example algorithms to be described below, the following additional assumptions are made. The R modules connect to host devices and respond to IO requests received from those host devices. The C modules maintain A2H tables, storing address to hash entries as well as "dirty" bitmaps that mark which pages were written. The D modules persist data addressed by hash, that is, can fetch a page based on its hash, or store a page and return its hash. When a page is referenced multiple times, a reference count ("refcount") signifies how many times it is referenced in the system. For simplicity, the following description will not make a distinction between short hash and long hash, also referred to herein as hash handle and hash digest, respectively, but will instead refer generally to "hash."

The responsibility for the entire logical address space is illustratively divided among the C modules by dividing all possible sub-LUNs among them. In some embodiments, this is done by utilizing bits 8-17 of the logical address, counting from a least significant bit (LSB), to create a slice number in the range of 0 to 1023. Initially, the 1024 slices are evenly divided among all available C modules. This is an example of what is also referred to herein as an "initial slice assignment." Since bits 0-7 of the logical address are not part of the slice number, each contiguous set of 256 pages (4 MB) belongs to the same sub-LUN and is thus part of the same slice handled by the same C module. A wide variety of other slice configurations can be used in other embodiments.

An example of a write flow for use in some embodiments is as follows:

1. R module receives a write request of one or more pages of data, a volume ID, and a logical address in the volume. For simplicity, a single page write is assumed, but the techniques can be readily extended to multiple page writes.

2. R module computes the hash signature of the data page, as well as the slice associated with the logical address.

3. R module selects a C module based on the slice number.

4. R module sends IO request to the selected C module.

5. C module selects a D module based on the hash signature.

6. C module asks selected D module to persist the data page. If the hash already exists, D module will just increase the hash's reference count without allocating more storage space; otherwise, it gets the data page from R module and persists it. Persisting data includes saving it in D module write cache and saving a second copy in an independent journal. At a later point in time, data is destaged to disk and removed from D module memory.

7. C module updates A2H mapping with the address and hash signature. If there was an old hash at the address, the new write is considered an overwrite.

8. In case of an overwrite, C module instructs D module which owns the old hash to decrement the reference count ("decref") for the old hash. If D module determines this is the last reference to the old hash, it can remove that hash and the page it represents from storage.

9. Write is complete.

Data destage in D module uses locations on disk that are independent of the volume layout. For example, an extent of storage space can contain pages from different volumes and arbitrary addresses, saved with their RAID parity information, where RAID denotes Redundant Array of Independent Disks.

As noted above, the initial slice assignment in some embodiments comprises a substantially even slice assignment, such as an assignment in which 1024 slices are evenly divided among all available C modules.

Dynamic slice assignment in some embodiments alters this otherwise substantially even distribution of slices of a logical address space across storage nodes of a distributed storage system, responsive to a failure or other HA event involving at least one of the storage nodes. Such embodiments can dynamically adjust the assignment of slices of the logical address space to the storage nodes over time to take into account variations in IO processing capacities of the storage nodes.

These and other embodiments advantageously prevent one or more storage nodes that are adversely impacted by HA events from becoming processing bottlenecks for other ones of the storage nodes, thereby achieving overall improvements in the IO processing throughput of the distributed storage system.

For example, in embodiments incorporating flow control mechanisms that limit the number of IO operations that can be concurrently processed in the distributed storage system so as to meet strict maximum processing latency guarantees, dynamic slice assignment as disclosed herein can facilitate achievement of such guarantees, while also ensuring high utilization of storage node processing capacities.

In the presence of an example unbalanced condition, one or more storage nodes may have substantially more processing load than others. For example, an HA event such as a module failure and restart or a storage drive failure will add significant processing load to one or more impacted storage nodes.

During unbalanced periods, there will be at least one relatively slower storage node with an increased latency relative to the other storage nodes, which will cause the flow control mechanism to reduce the number of concurrent IO operations in the distributed storage system and potentially degrade the system performance as a result.

Illustrative embodiments herein dynamically alter the slice assignment so as to achieve an improved balance of the load between the nodes during such unbalanced periods, which will allow better utilization of the available processing resources of each node and thereby improve the overall system performance.

As indicated above, some embodiments implement storage nodes comprising R, C and D modules, each responsible for particular parts of the IO processing flow. The R modules are responsible for receiving and parsing IO requests and routing them to C modules based on target logical addresses. The logical address space is divided into slices that are initially distributed evenly across the C modules in the distributed storage system. When an IO request arrives, its corresponding slice is determined from the target logical address and the IO request is routed to the particular storage node that includes the C module that has been assigned the slice that includes the target logical address.

In some embodiments, a storage manager, possibly implemented on one or more of the storage nodes, maintains a slice-to-node ("S2N") table that maps slices of the logical address space to the storage nodes that contain the C modules that are assigned those slices. The C module is responsible for mapping the logical address from the IO request to the hash of the corresponding data block.

Dividing the logical address space into slices (e.g., 1024 slices) allows the system manager to assign each C module a particular set of slices. The C module is responsible for all operations that involve the slices it was assigned, such as processing read requests and write requests. The D module is responsible for reading/writing data from/to a RAID array or other set of storage devices according to the hash received from the C module.

Each IO request is typically processed by one of the R modules, one of the C modules and one of the D modules. The actual module of each type involved with processing a particular IO request is illustratively defined by random policy in the case of selection of an R module, and by the IO request parameters (e.g., logical address, hash, etc.) in the case of selection of C and D modules, which tends to provide a substantially even distribution of processing load among the modules in a statistical sense, absent any HA event. In other words, each R module typically communicates with all C modules and each C module typically communicates with all D modules, statistically. All variants of inter-module processing routes such as R1-C3-D2, R2-C4-D1, etc. are possible and can occur in practice.

As noted above, the distributed storage system illustratively uses a flow control mechanism that prevents the system from overloading. The flow control mechanism is especially important for clusters with strong IO latency constraints, for example, where a maximal allowed IO latency is guaranteed.

The flow control mechanism in some embodiments controls a "choker" size which regulates the number of in-flight IOs allowed in the system. The flow control mechanism collects latency information from the R, C and D modules in the system and uses that information in a feedback loop for adjusting the choker size based on the slowest path latency. Such a flow control mechanism uses the slowest route latency and not the average route latency because if the average route latency were used, the one or more weak nodes could be overloaded for a long duration, leading to various types of node instability and crashes. Moreover, even if the system remains operational, the latency of IOs processed by "slow" routes (e.g., routes involving "weak" nodes), could exceed an acceptable (e.g., guaranteed) latency limit and thereby cause IO timeouts in a client application.

When the system is balanced (e.g., all modules of each type are similar, and serve similar levels of IOPS statistically), the latency of each storage node is similar, where IOPS denotes IO operations per second. However, as indicated above, the system may become unbalanced, with one or more modules and their associated storage nodes having more processing load than other modules and their associated storage nodes, possible due to various types of HA events. For example, such HA events can include a module failure and subsequent restart of the module, which illustratively initiates a "lazy" load process for loading its metadata to memory. The lazy load process degrades the node performance. Another example of an HA event is a hardware failure such as a storage drive failure that initiates a computationally-intense rebuild process. The rebuild process degrades the system performance dramatically and impacts at least two storage nodes that are associated with the same DAE.

As indicated above, during unbalanced periods, there will be one or more slower nodes each with an increased latency. Since the flow control component adjusts the choker size according to the latency of the slowest route, the choker size will be reduced, such that fewer IOs will be allowed into the system. As a result, the system performance will be degraded (e.g., less IOPS), although there are one or more nodes that are underutilized, because the system load was adjusted according to the slowest nodes.

In illustrative embodiments, the system manager will receive the latency measurements from flow control components of the flow control mechanism, detect an unbalanced condition and identify the "weak" nodes. Then, the system manager will redistribute the slices such that C modules on the weak nodes will be responsible for fewer slices than C modules on the other nodes, and therefore will receive less load.

It is assumed in some embodiments that the flow control mechanism comprises flow control components in respective ones of the R modules, and that each such flow control component receives latency statistics from all or substantially all of the other modules in the system. For example, each R, C and D module illustratively maintains its own end-to-end latency statistics for some specified monitoring interval (e.g., 3 second, 5 seconds, 10 seconds, etc.), and periodically includes that information as an extra payload in a regular IO-related module information interchange. Each module also maintains the latency statistics it receives from the other modules and periodically includes that information as an extra payload in the regular IO-related module information interchange. Therefore, since each R module communicates with every C module, and each C module communicates with every D module, as mentioned previously, it is guaranteed in some embodiments that every R module will have the latency statistics of each module included in the system. The flow control component in each R module illustratively calculates the slowest route (e.g., slowest C latency+slowest D latency) and uses it as a feedback for the dynamic choker size.

Illustrative embodiments herein utilize such latency statistics reported by the modules of the distributed storage system in implementing dynamic slice assignment. For example, some embodiments implement the following algorithm for dynamic slice control across the multiple storage nodes of a distributed storage system:

1. The system manager periodically queries the flow control components in respective ones of the R modules and receives the latency statistics for each module. The system manager now has a clear indication about the most overloaded (e.g., slowest) modules and/or nodes.

2. The system manager calculates the individual latency for each node in the system, and an average latency of all nodes. This provides an artificial metric that gives an indication about the relative node load, where k=1, . . . N is a node index:

(a) calculate node k average load=Average R[k]+Average C[k]+Average D[k]; and (b) calculate the average latency of all nodes.

3. The system manager detects whether the system is unbalanced by checking if there is a significant latency imbalance between nodes, for example, nodes with average latency higher (by a specified threshold) than the average during some measurement interval. This interval should be long enough (e.g., about 5 seconds to 10 seconds long) to exclude statistical hiccups, that is, to ensure the imbalance is steady.

4. If the system is unbalanced, the system manager identifies the weak (e.g., slowest) nodes, and then takes previously-assigned slices from C modules on the weak nodes and distributes them evenly to C modules on the other nodes. The system manager rebalances the system adaptively, illustratively by moving few slices from the weak nodes to the other nodes. If the unbalanced condition remains, the same steps will be performed in the next iteration and more slices are reassigned, until the system is balanced.

5. By reassigning more slices to a C module, that module will service a greater share of the logical address space, as more IOs will be directed to that module by the R modules and therefore the corresponding storage node will get more IO processing load.

6. Since the address space is divided into relatively many slices, compared to the number of modules, the system manager can address both small imbalances between nodes (e.g., by moving few slices) as well as larger imbalances between nodes (e.g., by gradually moving more slices from the weak nodes to the other nodes).

This example algorithm will dynamically balance the system when some storage nodes experience high loads due to high availability events (e.g. process restart, failed drives, etc.) or any other reason.

Consequently, the worst R-C-D latency measurement will improve (e.g., be reduced) and the flow control mechanism will allow more IOs into the system (e.g., increase the choker size), which will improve the system performance.

It is to be appreciated that the particular example algorithm described above is presented by way of illustration only, and should not be construed as limiting in any way. Additional or alternative steps can be used, and the ordering of the steps can vary in other embodiments, possibly with each of one or more steps being performed at least in part in parallel with one or more other steps.

These and other embodiments disclosed herein provide significant advantages over approaches that require used of a fixed slice assignment or a substantially even slice assignment across storage nodes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Referring now to FIG. 5, an example of a storage node processing device 500 is shown. Such a processing device illustratively comprises at least a portion of a storage node of a distributed storage system, such as one of the storage nodes 102 of FIG. 1. The storage node that includes storage node processing device 500 is part of a distributed storage system implementing dynamic slice assignment as disclosed herein.

The processing device 500 in this embodiment comprises a multi-core processor including processing cores 510-0, 510-1, . . . 510-P. The processing core 510-0 implements a system manager 516, a performance monitor 518 and an adaptive flow control module 520 comprising at least one feedback loop.

The other processing cores 510-1 through 510-P execute respective truck threads 524-1 through 524-P, comprising respective sets of multiple sub-threads illustratively in the form of X-threads 525-1 through 525-P. Other types of sub-threads can be used in other embodiments. The processing cores 510-1 through 510-P also execute respective sets of one or more other application threads 526-1 through 526-P. These and other threads illustratively comprise operating system (OS) threads of their respective cores 510.

For example, in the case of a block-storage application, which handles the block-based storage functionality of the distributed storage system, the block-storage application executes truck threads 524 on respective ones of the cores 510 of the processing device 500. These truck threads 524 implement the block-storage application functionality. In some embodiments, each of the truck threads 524 may be hard affined to a particular one of the processing cores 510, such that it may only execute on that particular core.

The processing cores 510 in some embodiments illustratively comprise respective distinct central processing units (CPUs). Accordingly, each of the storage nodes 102 of the distributed storage system of FIG. 1 may be viewed as comprising a multi-core CPU and an associated storage array comprising a set of storage devices 106, although numerous other arrangements are possible. The storage array or other arrangement of storage devices 106 associated with a given one of the nodes 102 may comprise, for example, a DAE, although such references herein to "disks" should not be construed as an indication that the storage devices are limited to HDDs or other rotating magnetic storage media.

The above-noted multi-core CPU illustratively runs the block-storage application on top of a preemptive OS, where a preemptive OS can preempt (e.g., stop) a running OS thread without its cooperation, and execute something else, such as another OS thread. The block-storage application is illustratively running a single hard-affined OS thread per each CPU core, which implements the block-storage functionality. This OS thread is an example of what is also referred to herein as a "truck thread." Truck threads and other application threads running on a given CPU core or other processing core are more generally referred to herein as "core threads" of that processing core.

As part of its operation, each of the truck threads 524 polls a corresponding set of interfaces of the distributed storage system for tasks, events, or other data to be processed by that truck thread. For example, the set of interfaces may include an interface for indications of completions of submitted IO requests, an interface for IO requests from the user, and interfaces for other tasks, events, or other data. Any other interfaces may also be polled. Each truck thread, by design, fully utilizes the processing core that it is executing on for both interface polling and processing of the corresponding tasks, events, or other data. For example, in illustrative embodiments, each truck thread is designed to fully utilize the processing core that it is executing on because, even when there is no actual processing of tasks to be performed, the truck thread continues checking its respective interfaces via polling. This design is optimized for a storage system that requires low latency and high IOPS since no context switches or interrupts are required to perform the processing. In some embodiments, the functionality of the block-storage application may be described as an always-polling model.

In some embodiments, example interfaces that may be polled by a truck thread may include a front-end interface, an RPC messaging interface, an RDMA messaging interface, and a back-end interface. In some embodiments, any other interface commonly used in a storage system may also be polled by the truck thread. In some embodiments, each truck thread defines an IO-provider instance for each corresponding interface that it is responsible for polling.

The front-end interface illustratively comprises an interface for receiving and replying to IO requests from users of the distributed storage system associated with respective ones of the host devices 101. For example, a given truck thread may comprise a front-end IO-provider instance that polls for new IO requests from one or more host devices 101 or other system users. In some embodiments, for example, IO requests received by the distributed storage system from the user are pooled together in a common pool that is shared between the truck threads 524 and accessed using a front-end IO-provider instance.

The RPC messaging interface illustratively comprises an interface for sending and receiving messages to and from other storage nodes 102 of the distributed storage system. For example, a given truck thread may comprise an RPC messaging IO-provider that polls for new messages from other storage nodes 102 in the distributed storage system. As an example, when one of the storage nodes 102 sends an IO request to another one of the storage nodes 102, the sender node selects the specific destination truck thread, that is, the truck thread that will receive and handle the request.

The RDMA messaging interface illustratively comprises an interface for RDMA transfer of buffers between storage nodes 102. For example, a given truck thread may comprise an RDMA messaging IO-provider that polls for the completion of RDMA transfers between storage nodes 102.

The back-end interface illustratively comprises an interface for accessing the storage devices 106 in order to write data to and read data from the storage devices 106. For example, a given truck thread may comprise a back-end IO-provider that polls for the completion of write and read requests initiated by the truck thread to one or more of the storage devices 106 of processing device 500.

In some cases, the distributed storage system may also implement one or more other applications aside from the block-storage application. For example, a file-storage application that provides a file interface to a user of the information processing system 100 may also be implemented by the distributed storage system, for example, by executing corresponding threads 526 on one or more of the cores 510. In some cases, the block-storage application and the file-storage application, or any other application, may be implemented by the distributed storage system simultaneously, each with a different load that can dynamically change over time.

Since these applications are attempting to utilize the same set of processing cores 510 simultaneously, management of the available processing resources of these cores 510 between the applications can be challenging. For example, since the block-storage application is implemented by executing truck threads 524 on each of the processing cores 510 of each of the storage nodes 102, and these truck threads 524 can utilize the full capacity of those processing cores 510, little to no processing resources of the distributed storage system may be available for use by threads 526 of another application.

In some embodiments, if only the file-storage application is actively in use, such that no tasks, events, or other data are present for the truck threads 524 to process, the associated file threads may only be able to utilize a portion of the processing resources of a core, such as 50% or another percentage, where the remaining portion, such as the other 50% or another percentage, will be used by the truck threads 524 just for polling interfaces. In cases where the block-storage application is actively performing operations, the truck threads 524 will utilize a substantial portion of the processing resources of the cores, such as 90%, 95%, or even 100%, to both poll the interfaces and process any tasks, events, or other data found on those interfaces during the polling, which leaves little to no processing resources available on those cores for use by other applications such as a file-storage application.

Examples of storage systems that allow the full processing resources of a core to be available for use by other applications, even when a truck thread of a block-storage application is utilizing that core to support its functionality, are disclosed in U.S. patent application Ser. No. 16/251,779, filed Jan. 18, 2019, now U.S. Pat. No. 10,871,991, and entitled "Multi-Core Processor in Storage System Executing Dedicated Polling Thread for Increased Core Availability," which is incorporated by reference herein in its entirety. This patent application more particularly discloses a storage system that in one or more illustrative embodiments is able to dynamically adapt to the user operation patterns of multiple simultaneously implemented applications where, for example, one of the applications executes an always-polling model of functionality that consumes significant processing resources using the above-described truck threads.

Additionally, techniques are disclosed in the above-cited U.S. patent application Ser. No. 16/251,779 for creating an event-driven storage system out of a storage system implementing the above-described always-polling model, through the use of a dedicated peek-poller thread. The dedicated peek-poller thread serves as a mechanism to allow for the sharing of the full resources of the other cores in a processing device between the two or more applications in a manner that dynamically matches the user operation pattern. For example, the dedicated peek-poller thread is executed on a core of the processing device and partially replaces the polling functionality of each of the truck threads executing on the other cores in the processing device, thereby freeing up the processing resources of those other cores that would otherwise be used by the truck threads for polling for use by other applications during times when the block-storage application is experiencing reduced activity.

However, a situation may arise where, for example, the block-storage application is utilizing the full resources of the processing cores 510 such that having a dedicated peek-poller thread executing on one of the cores 510 reduces the total amount of processing resources available to the block-storage application. For example, if there are ten cores available on the processing device 500, and one of the cores is executing a dedicated peek-poller thread, only nine of the cores or 90% of the processing resources of the processing device are available for use by the block-storage application.

U.S. patent application Ser. No. 16/251,868, filed Jan. 18, 2019, now U.S. Pat. No. 10,884,799, and entitled "Multi-Core Processor in Storage System Executing Dynamic Thread for Increased Core Availability," also incorporated by reference herein in its entirety, discloses in illustrative embodiments dynamic truck threads that may be executed on the cores of a processing device. The function of each of the dynamic truck threads is modifiable between multiple operating modes such that the full processing resources of all of the cores of a processing device are available for use by a block-storage application during periods of time when the block-storage application is exhibiting high levels of core utilization while the processing resources of the cores are also available for other applications during periods of time when the block-storage application is exhibiting moderate to low levels of core utilization.

For example, in such embodiments, the function of a given dynamic truck thread is dynamically modifiable between an operating mode where the given dynamic truck thread performs the above-described truck thread functionality and an operating mode where the given dynamic truck thread performs at least some of the above-described peek-poller thread functionality. In some embodiments, the functionality of each of the dynamic truck threads may also be modified to an operating mode where all functions of the dynamic truck threads are disabled on the cores 510 of the processing device 500 such that the processing resources of the cores 510 are fully available for use by other applications, such as a file-storage application.

Illustrative embodiments disclosed herein can utilize one or more of the techniques disclosed in the above-cited U.S. patent application Ser. Nos. 16/251,779 and 16/251,868. For example, one or more of the truck threads 524 of FIG. 5 may be implemented as respective dynamic truck threads. However, it is to be appreciated that utilization of such techniques is not required in illustrative embodiments disclosed herein.

The processing cores 510 of the FIG. 5 embodiment can therefore execute threads of multiple applications, including truck threads 524 and other application threads 526. For example, in some embodiments, a block-storage application is implemented by executing truck threads 524 on respective ones of the cores 510, with each of the truck threads 524 implementing a corresponding portion of the block-storage application. As described above, by executing truck threads 524 on respective cores 510, a significant portion of the processing resources of each of the cores 510 is utilized for polling interfaces associated with its corresponding truck thread, and processing associated tasks, events or other data found on those interfaces, leaving little to no processing resources available on that core for executing the threads of other applications. Some embodiments address this issue through the use of dynamic truck threads executing on one or more of the processing cores 510.

Performance monitoring techniques are illustratively used in distributed storage system to monitor the performance of core threads, such as the truck threads 524 executing on respective ones of the processing cores 510.

In some embodiments, the processing device 500 of the distributed storage system is configured to implement performance monitoring functionality for core threads of the distributed storage system, such as the truck threads 524 that include respective schedulers 530. One or more of the schedulers 530 can each include both an internal scheduler and an external scheduler, as disclosed in U.S. patent application Ser. No. 16/747,138, filed Jan. 20, 2020, now U.S. Pat. No. 11,232,010, and entitled "Performance Monitoring for Storage System with Core Thread Comprising Internal and External Schedulers," which is incorporated by reference herein in its entirety.

The performance monitor 518 is configured to monitor performance of threads executing on the processing cores 510, such as truck threads 524 and other application threads 526. Such performance monitoring in illustrative embodiments involves collecting performance measurements from respective ones of the core threads. Such performance measurements made by the performance monitor 518 are illustratively utilized by the adaptive flow control module 520 as well the system manager 516.

For example, in the FIG. 5 embodiment, the truck thread 524-1 is assumed to be part of a block-storage application executing on the processing core 510-1. The truck thread 524-1 comprises a scheduler 530-1, which as noted above may include an internal scheduler, illustratively configured to control switching between particular ones of the X-threads 525-1 of the truck thread 524-1, and an external scheduler, illustratively configured to control release of the processing core 510-1 by the truck thread 524-1 for use by at least one of the other application threads 526-1 of a second application different than the block-storage application. In some embodiments, the second application comprises a file-storage application, although references herein to block-storage applications and file-storage applications are considered non-limiting examples.

The performance monitor 518 illustratively gathers such performance measurements from the truck thread 524-1 and from other ones of the truck threads 524 executing on respective other ones of the cores 510, and provides such measurements to the system manager 516 for use in controlling configuration of the processing device 500 and its processing cores 510 and their associated threads 524 and 526. As mentioned previously, the truck thread 524-1 when executing on the processing core 510-1 is illustratively configured to utilize substantially all available processing resources of the processing core 510-1, such as 90% or more of the available processing resources of that core. Other embodiments can combine at least portions of system manager 516 and performance monitor 518 into a single component implemented on one or more processing cores 510 of at least one of the processing devices 108. The adaptive flow control module 520 can similarly be combined with one or both of the system manager 516 and performance monitor 518 in other embodiments.

As indicated above, the truck threads 524 run respective sets of X-threads 525. The X-threads 525 illustratively comprise respective lightweight threads that are scheduled by the schedulers 530 of the respective truck threads 524. For example, there may be thousands of X-threads 525 associated with each of the truck threads 524, with each of the X-threads 525 representing a specific flow or processing job (e.g., synchronous read/write, destage, RAID rebuild, defragmentation, and numerous others). The X-threads 525 in some embodiments are non-preemptive (e.g., cooperative), which means that one of the X-threads of a particular truck thread voluntarily gives up execution in order to allow another one of the X-threads of that truck thread to be scheduled. If an X-thread is doing a lengthy computational task (e.g., a task taking tens of microseconds), it should contain explicit yield and/or suspension calls, or implicit calls by waiting on synchronization objects.

It is assumed in some embodiments herein that each X-thread can be in one of multiple designated states at a particular point in time, including, for example, a running state, a ready state and a suspended state. In the running state, the X-thread is currently running. In the suspended state, the X-thread is waiting on a synchronization object (e.g., a semaphore, a timer, a lock, a barrier, a memory pool, a thread pool, etc.) In the ready state, the X-thread is ready to run, but waiting for the processing core (e.g., another X-thread is currently running).

The X-threads 525-1 are examples of what are more generally referred to herein as "sub-threads" of their corresponding truck thread 524-1. Other types of sub-threads having different arrangements of possible states can be used in other embodiments.

The X-threads 525-1 in some embodiments therefore comprise respective non-preemptive threads and the truck thread 524-1 is configured such that no X-thread in the running state is suspended to allow release of the processing core 510-1 by the truck thread 524-1 for use by the other application thread 526-1. Multiple suspensions of the truck thread 524-1 to allow the other application thread 526-1 to execute may therefore each occur in conjunction with a switch between X-threads 525-1 of the truck thread 524-1. As mentioned previously, the scheduling of the X-threads 525-1 is illustratively performed under the control of an internal scheduler in scheduler 530-1 of the truck thread 524-1.

In some embodiments, an external scheduler in scheduler 530 of the truck thread 524-1 comprises a processing core release component and a waker component. The processing core release component is configured to determine, in conjunction with each switch between X-threads 525-1 of the truck thread 524-1, whether or not the truck thread 524-1 will suspend itself so as to release the processing core 510-1 for use by at least another application thread 526-1 of the file-storage application. The processing core release component in some embodiments may be referred to as a CPU release component, as the processing cores such as cores 510 may comprise respective distinct CPUs of the processing device 500.

In some embodiments, the processing core release component of the truck thread 524-1 more particularly operates as follows. On every X-thread switch, a determination is made as to whether or not the truck thread 524-1 will give up execution, to allow other applications (e.g., a file-storage application) to run. When a truck thread suspends itself, it will resume execution when no other application is ready to run, or it will be rescheduled to run after a certain time by the waker component, whichever happens first.

The waker component is configured to determine, in conjunction with each switch between X-threads 525-1 of the truck thread 524-1, whether or not there is at least one additional thread of the block-storage application to be returned from suspension prior to release of the processing core 510-1 by the truck thread 524-1.

The waker component in some embodiments more particularly operates as follows. On every X-thread switch, and before the decision is made whether to give up the processing core, the waker component checks if there are currently one or more other truck threads of the block-storage application that are suspended and need to be awakened, and if so it wakes up the one or more other truck threads.

The processing core release component therefore illustratively operates in conjunction with the waker component to suspend the truck thread 524-1 and to return the truck thread 524-1 from suspension. Other arrangements of additional or alternative components can be included in the external scheduler of scheduler 530-1 in other embodiments.

In some embodiments, the threads of the one or more applications executing on at least one of the processing cores 510 comprise different X-threads 525 of one or more truck threads 524 of one or more applications executing on a particular one of the processing cores 510, such as processing core 510-1. For example, the one or more applications can comprise a block-storage application of the distributed storage system and the one truck threads can comprise truck thread 524-1 that when executing on the processing core 510-1 is configured to utilize substantially all available processing resources of that processing core.

As indicated previously, each of the X-threads 525-1 of the truck thread 524-1 is illustratively in one of multiple designated states at a particular point in time, including a running state, a ready state and a suspended state. Other types and arrangements of states can be used in other embodiments.

Different ones of the X-threads 525-1 that are in the ready state are illustratively enqueued in one or more of the thread queues 532-1 in order to wait for access to a CPU resource of the processing core 510-1. The thread queues that are used to hold X-threads 525-1 that are in the ready state are also referred to herein as "ready queues." A ready queue is considered an example of a "thread queue" as that term is broadly used herein.

Other ones of the X-threads 525-1 that are in the suspended state are illustratively enqueued in respective different ones of the thread queues 532-1 in order to wait for access to respective corresponding synchronization objects associated with resources of the processing core 510-1. A given such synchronization object can include, for example, a semaphore, a timer, a lock, a barrier, a memory pool and a thread pool, or various combinations thereof.

Accordingly, when in the ready state, a given one of the X-threads 525-1 is illustratively queued in a ready queue associated with the scheduler 530-1. Such ready queues are assumed to be part of the thread queues 532-1 of the processing core 510-1. When in the suspended state, the X-thread is illustratively queued in one of the thread queues 532-1, other than one of the ready queues.

Although shown as separate from the scheduler 530-1 in this embodiment, at least a portion of the thread queues 532-1 may be implemented as part of the scheduler 530-1 in other embodiments. For example, the ready queues may in some embodiments be implemented as part of the scheduler 530-1. Also, the scheduler 530-1, although illustratively shown as part of the truck thread 524-1 in the present embodiment, could instead be implemented as a separate component of the processing core 510-1 in other embodiments.

The distributed storage system illustratively receives an IO operation for processing, from one of the host devices 101, and performs what is referred to herein as "end-to-end" processing of the IO operation using adaptive flow control.

As indicated elsewhere herein, the processing of the IO operation is illustratively distributed across a plurality of distinct storage nodes 102 of the distributed storage system, with each of the storage nodes 102 including a processing device similar to processing device 500 and comprising a corresponding set of processing cores 510 of the distributed storage system. The processing of a given IO operation in the distributed storage system can involve generation of different threads on different ones of the storage nodes 102.

The processing of the IO operation in the distributed storage system can be a very complex process that goes through many steps in multiple ones of storage nodes 102, with each such storage node running many different jobs involving different flows and components, with potentially large numbers of cross-dependencies. The disclosed techniques advantageously facilitate the provision of adaptive flow control for IO operations in these and numerous other storage system contexts, as will be described in more detail below.

The processing of a given IO operation is illustratively comprised of intervals of X-thread processing time and waiting time. The latter illustratively includes time spent in thread queues waiting for the above-noted synchronization objects, and/or RPC replies, disk acknowledgments, resource allocations, and so on.

In some embodiments, at least a portion of the thread queues 532-1 may comprise prioritized thread queues, illustratively used for all or substantially all synchronization objects for which threads encounter significant waiting times, as disclosed in U.S. patent application Ser. No. 16/915,380, filed Jun. 29, 2020 and entitled "End-to-End Quality of Service Mechanism for Storage System Using Prioritized Thread Queues," which is incorporated by reference herein in its entirety. An example implementation of a prioritized thread queue ("PrioThQ") provides flexible and distinct dequeuing policies for X-threads of a given IO operation based on assigned class of service (CoS) tags. For example, each of a plurality of different synchronization objects may have respective different PrioThQs associated therewith. The PrioThQ may be a generalization of a basic ThQ class, where ThQ denotes a single thread queue, illustratively a simple first-in first-out (FIFO) queue. The PrioThQ provides a generic basis for different prioritized synchronization objects, such as semaphores, timers, locks, barriers, memory pools, thread pools etc. The PrioThQ may be viewed as aggregation of several simple ThQs with a smart dequeuing policy for dequeuing threads from those multiple ThQs. It is to be appreciated that use of prioritized thread queues is not required, and may be eliminated in other embodiments. A wide variety of additional or alternative types of thread queues can be used as part of the thread queues 532-1 of the processing core 510-1.

Performance monitoring functionality implemented in distributed storage system in some embodiments includes aspects of performance monitoring as disclosed in U.S. Pat. No. 10,152,232, entitled "Low-Impact Application-Level Performance Monitoring with Minimal and Automatically Upgradable Instrumentation in a Storage System," which is incorporated by reference herein in its entirety.

For example, U.S. Pat. No. 10,152,232 describes techniques for monitoring of storage system processing time dynamics at a flow level, in order to generate performance measurements that can be used for various purposes such as for the investigation and debugging of issues as well as for performance analysis of the storage system.

However, other performance monitoring techniques can be implemented in other embodiments, and illustrative embodiments should therefore not be viewed as being limited to use with any particular performance monitoring techniques, such as those disclosed in U.S. Pat. No. 10,152,232.

The manner in which processing device 500 provides adaptive flow control using at least one feedback loop will now be described in more detail. Again, each of the other processing devices of respective storage nodes 102 may be configured in a manner similar to that described herein with regard to processing device 500. It is to be appreciated that in some embodiments, different end-to-end latency measurements are generated for each of a plurality of IO operations processed by the distributed storage system. The term "end-to-end" in this context illustratively refers to processing of a given IO operation from receipt of that IO operation in the distributed storage system from a given one of the host devices 101 to completion of the processing of that IO operation in the distributed storage system. Other types and arrangements of latency measurements can be provided in other embodiments.

As indicated previously, the distributed storage system in some embodiments includes a flow control mechanism to prevent overloading of the storage nodes 102 of the storage system. In illustrative embodiments, such functionality is provided using the adaptive flow control module 520, and possibly similar modules or other associated logic implemented on one or more other ones of the storage nodes 102. The use of a flow control mechanism is particularly important in distributed storage systems with strict latency limits or other performance guarantees, such as a guaranteed end-to-end latency at or below a specified maximum latency for all IO operations processed by the storage system.

It is generally not desirable for such a flow control mechanism to be based on constant preconfigured IOPS thresholds, since the storage system load level strongly depends on the input pattern of IO operations. For example, a particular IO pattern with "big reads" mixed with "small writes" or some other specific combination of IO operations may load the storage system substantially more than some other IO pattern, even if the particular IO pattern provides the same overall processing bandwidth as the other IO pattern.

U.S. Pat. No. 10,048,874, entitled "Flow Control with a Dynamic Window in a Storage System with Latency Guarantees" and incorporated by reference herein in its entirety, discloses in one or more illustrative embodiments a flow control mechanism in which a window size is adjusted depending on actual average end-to-end latency of IO operations. For example, in some embodiments disclosed therein, when the latency exceeds a first "high latency" threshold, the dynamic flow control window size is decreased. Similarly, when the average end-to-end latency is less than a second "low latency" threshold, the dynamic flow control window size is increased.

Such a mechanism generally provides good adaptiveness to short-term load fluctuations and hiccups, illustratively on the order of seconds, minutes or hours, thereby preventing the storage system from entering into an unsafe or unpredictable zone "after the shoulder" of a curve of latency as a function of IOPS. For latency values in or near this zone, the latency can grow rapidly or in an uncontrolled manner with further increases in IOPS.

In some embodiments, a flow control mechanism is configured to limit the number of IO requests or chunks of IO requests that can be concurrently processed in the distributed storage system. The flow control mechanism illustratively includes a flow control window that defines a maximum total data size that is available for the concurrent processing. For example, the flow control window may define a maximum number of logical blocks of a particular unit size that are allowed to be concurrently processed by the storage system. The logical blocks may be specified in terms of a unit size of 512 bytes, although a wide variety of other unit sizes can be used in defining a flow control window, such as 4 KB, 8 KB, 16 KB and so on, as appropriate to a given storage system implementation.

In some embodiments, the distributed storage system is configured to split large IO requests into smaller chunks for processing. For example, if the size of a large IO request is greater than a specified maximum IO size of the storage system, the large IO request is split into separate chunks of each having no more than the maximum IO size. Each chunk may be processed by the distributed storage system using a different thread with each chunk passing through the flow control mechanism independently.

In a typical case, the flow control window size is much greater than the maximum IO size and many chunks may be processed concurrently. This concurrent processing may occur even where multiple chunks have a size equal to the maximum IO size. For example, the flow control window size during typical operations may be four times, eight times, or any other amount larger than the maximum IO size.

In so-called "edge cases," such as situations where a significant or high percentage of the storage system resources are utilized by critical background tasks or otherwise not available for servicing IO requests, the average IO latency of the storage system may greatly increase. As an example, a double SSD failure in a RAID array may be an edge case that causes the IO latency of the storage system to greatly increase as the processing resources of the storage system are used to rebuild the RAID array or perform other related actions.

U.S. Pat. No. 10,606,519, entitled "Edge Case Handling in System with Dynamic Flow Control" and incorporated by reference herein in its entirety, discloses illustrative embodiments for more efficient processing of IO requests and chunks during periods of high IO latency in the storage system when the flow control window size is dynamically reduced below the maximum IO size of the storage system. For example, such embodiments allow IO requests and chunks having a size greater than the flow control window size to pass through the flow control mechanism in a serialized manner.

Other embodiments can utilize multiple feedback loops, as disclosed in U.S. patent application Ser. No. 17/077,559, filed Oct. 22, 2020, and entitled "Storage System with Adaptive Flow Control Using Multiple Feedback Loops," which is incorporated by reference herein in its entirety.

The particular storage node processing device configurations described above in the context of FIG. 5 are only examples, and numerous other processing device configurations can be used in other embodiments.

Illustrative embodiments of processing platforms utilized to implement host devices and distributed storage systems with functionality for dynamic slice assignment will now be described in greater detail with reference to FIGS. 6 and 7. Although described in the context of system 100, these platforms may also be used to implement at least portions of other information processing systems in other embodiments.

Figure 6:
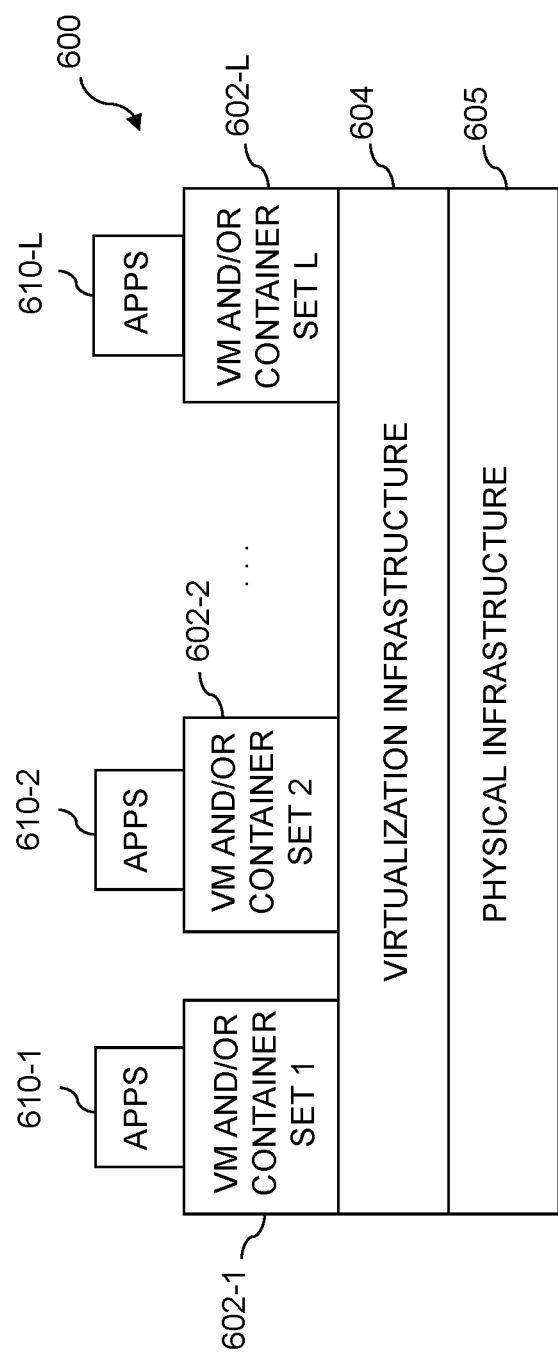
FIGS. 6 and 7 show examples of processing platforms that may be utilized to implement at least a portion of an information processing system in illustrative embodiments.
Figure 7:
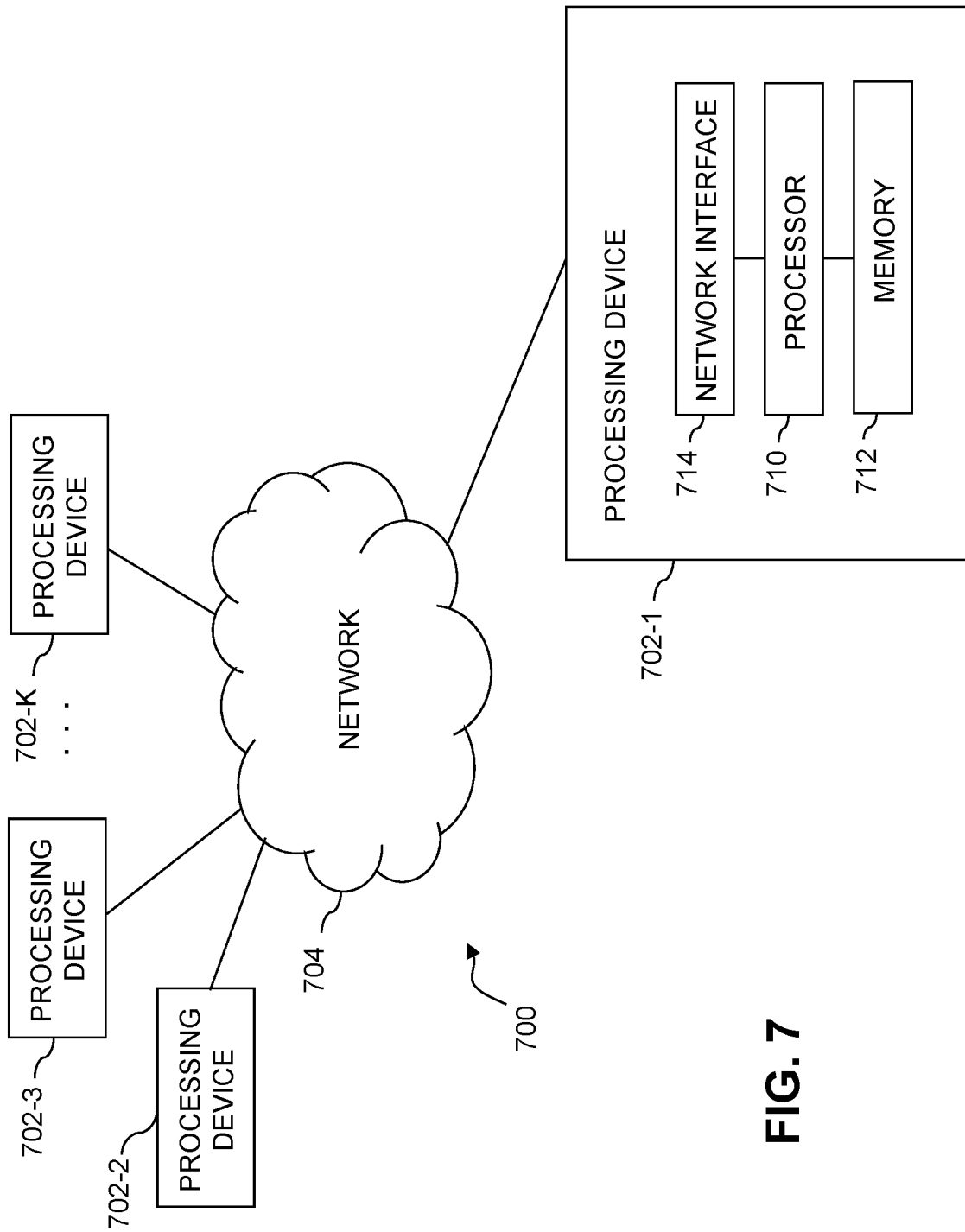

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for dynamic slice assignment in a distributed storage system of the type described above using one or more processes running on a given one of the VMs. For example, each of the VMs can implement logic instances and/or other components for implementing functionality associated with dynamic slice assignment in the CAS system 205.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide functionality for dynamic slice assignment in a distributed storage system of the type described above.

For example, a container host device supporting multiple containers of one or more container sets can implement logic instances and/or other components for implementing functionality associated with dynamic slice assignment in the CAS system 205.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for dynamic slice assignment provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, local and remote interfaces, deduplication logic, system managers and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to monitor latencies associated with processing of input-output operations in a plurality of storage nodes of a distributed storage system;
   to detect an unbalanced condition between the storage nodes based at least in part on the monitored latencies; and
   responsive to the detected unbalanced condition, to adjust an assignment of slices of a logical address space of the distributed storage system to the storage nodes;
   wherein the slices of the logical address space comprise respective sets of contiguous pages corresponding to respective different fractional portions of a given logical storage volume;
   wherein the different fractional portions of the given logical storage volume are stored on different ones of the storage nodes utilizing the corresponding slices assigned to that storage node;
   wherein each of at least a subset of a plurality of storage nodes of the distributed storage system comprises a set of processing modules configured to communicate with corresponding sets of processing modules on other ones of the storage nodes, the sets of processing modules of the storage nodes of the distributed storage system collectively comprising at least a portion of a distributed storage controller of the distributed storage system;

wherein monitoring latencies associated with processing of input-output operations in the storage nodes comprises:
  obtaining latency measurements from flow control components implemented in respective ones of the processing modules implemented in respective ones of the storage nodes; and
  utilizing the latency measurements in a feedback loop for adjusting a choker size to limit concurrent processing of input-output operations in the distributed storage system;
wherein one or more of the sets of processing modules each comprise at least a routing module, a control module and a data module; and
wherein adjusting an assignment of slices of the logical address space of the distributed storage system to the storage nodes responsive to the detected unbalanced condition comprises modifying a number of the slices assigned to control modules of one or more of the storage nodes based at least in part on latencies of the corresponding one or more storage nodes.

2. The apparatus of claim 1 wherein said at least one processing device comprises at least one processing core of a multi-core storage node of the distributed storage system.

3. The apparatus of claim 1 wherein monitoring latencies associated with processing of input-output operations in the storage nodes comprises:
  periodically obtaining latency measurements from flow control components implemented in respective ones of the storage nodes; and
  computing individual latencies of the respective ones of the storage nodes and an average latency of the respective storage nodes based at least in part on the obtained latency measurements;
  the flow control components being part of an adaptive flow control mechanism of the distributed storage system;
  the adaptive flow control mechanism comprising a feedback loop in which a window size defining an amount of concurrent processing of the input-output operations in the distributed storage system is adjusted responsive to a measured latency in processing of one or more of the input-output operations;
  wherein the measured latency for processing of one or more of the input-output operations comprises an average end-to-end latency measured over multiple ones of the input-output operations; and
  wherein the window size defines a maximum permitted amount of concurrent processing of the input-output operations in the distributed storage system in terms of a number of data units of a particular size.

4. The apparatus of claim 1 wherein detecting an unbalanced condition between the storage nodes based at least in part on the monitored latencies comprises determining if at least one of the storage nodes has a relatively high latency that deviates by more than a threshold amount from an average latency of the storage nodes.

5. The apparatus of claim 1 wherein adjusting an assignment of slices of the logical address space of the distributed storage system to the storage nodes responsive to the detected unbalanced condition comprises increasing a number of the slices assigned to one or more of the storage nodes having relatively low latencies and decreasing a number of slices assigned to one or more of the storage nodes having relatively high latencies.

6. The apparatus of claim 1 wherein adjusting an assignment of slices of the logical address space of the distributed storage system to the storage nodes responsive to the detected unbalanced condition comprises modifying an initial assignment of the slices to the storage nodes in which the slices are evenly distributed across the storage nodes with each of the storage nodes being assigned the same number of slices.

7. The apparatus of claim 1 wherein adjusting an assignment of slices of the logical address space of the distributed storage system to the storage nodes responsive to the detected unbalanced condition comprises increasing a number of the slices assigned to control modules of one or more of the storage nodes having relatively low latencies and decreasing a number of slices assigned to control modules of one or more of the storage nodes having relatively high latencies.

8. The apparatus of claim 1 wherein adjusting an assignment of slices of the logical address space of the distributed storage system to the storage nodes responsive to the detected unbalanced condition comprises modifying an initial assignment of the slices to the control modules of the storage nodes in which the slices are evenly distributed across the control modules of the storage nodes with each of the control modules of the storage nodes being assigned the same number of slices.

9. The apparatus of claim 1 wherein monitoring latencies associated with processing of input-output operations in the storage nodes comprises periodically obtaining latency measurements from flow control components implemented in respective ones of the routing modules implemented in respective ones of the storage nodes.

10. The apparatus of claim 9 wherein a given one of the flow control components in a corresponding one of the routing modules is configured:
  to determine latency of its corresponding routing module;
  to determine latencies of each of at least a subset of the control modules;
  to determine latencies of each of at least a subset of the data modules; and
  to report the determined latencies to a system manager module implemented in at least one of the storage nodes, the system manager module processing the latencies received from the given flow control component in the corresponding one of the routing modules and latencies received from other ones of the flow control components in other ones of the routing modules to compute individual latencies of respective ones of the storage nodes and an average latency of the respective storage nodes.

11. The apparatus of claim 10 wherein the system manager module computes an individual latency of a given one of the storage nodes by summing an average routing module latency, an average control module latency and an average data module latency for the given storage node over a particular measurement interval.

12. The apparatus of claim 1 wherein adjusting an assignment of slices of the logical address space of the distributed storage system to the storage nodes responsive to the detected unbalanced condition comprises:
  making a first adjustment by increasing a number of the slices assigned to one or more of the storage nodes having relatively low latencies and decreasing a number of slices assigned to one or more of the storage nodes having relatively high latencies;
  determining whether or not the unbalanced condition still exists based at least in part on continued monitoring of latencies subsequent to making the first adjustment; and responsive to the unbalanced condition still existing, making an additional adjustment by further increasing the number of the slices assigned to one or more of the storage nodes having relatively low latencies and further decreasing a number of slices assigned to one or more of the storage nodes having relatively high latencies;

wherein one or more additional iterations of the determining and if necessary one or more further iterations of making an additional adjustment are performed until it is determined that the unbalanced condition no longer exists.

13. The apparatus of claim 1 wherein detecting an unbalanced condition between the storage nodes based at least in part on the monitored latencies comprises detecting an unbalanced condition attributable to at least one of:

failure and restart of at least one processing module of at least one of the storage nodes; and at least one storage drive failure impacting at least one of the storage nodes.

14. The apparatus of claim 1 wherein adjusting the assignment of slices to the storage nodes results in a first one of the different fractional portions of the given logical storage volume being reassigned from a first one of the storage nodes to a second one of the storage nodes while a second one of the different fractional portions of the given logical storage volume remains assigned to the first storage node.

15. A computer program product comprising a non-transitory processor-readable storage medium having stored therein program code of one or more software programs, wherein the program code when executed by at least one processing device causes said at least one processing device:

to monitor latencies associated with processing of input-output operations in a plurality of storage nodes of a distributed storage system;

to detect an unbalanced condition between the storage nodes based at least in part on the monitored latencies; and responsive to the detected unbalanced condition, to adjust an assignment of slices of a logical address space of the distributed storage system to the storage nodes;

wherein the slices of the logical address space comprise respective sets of contiguous pages corresponding to respective different fractional portions of a given logical storage volume;

wherein the different fractional portions of the given logical storage volume are stored on different ones of the storage nodes utilizing the corresponding slices assigned to that storage node;

wherein each of at least a subset of a plurality of storage nodes of the distributed storage system comprises a set of processing modules configured to communicate with corresponding sets of processing modules on other ones of the storage nodes, the sets of processing modules of the storage nodes of the distributed storage system collectively comprising at least a portion of a distributed storage controller of the distributed storage system;

wherein monitoring latencies associated with processing of input-output operations in the storage nodes comprises:

obtaining latency measurements from flow control components implemented in respective ones of the processing modules implemented in respective ones of the storage nodes; and utilizing the latency measurements in a feedback loop for adjusting a choker size to limit concurrent processing of input-output operations in the distributed storage system;

wherein one or more of the sets of processing modules each comprise at least a routing module, a control module and a data module; and wherein adjusting an assignment of slices of the logical address space of the distributed storage system to the storage nodes responsive to the detected unbalanced condition comprises modifying a number of the slices assigned to control modules of one or more of the storage nodes based at least in part on latencies of the corresponding one or more storage nodes.

16. The computer program product of claim 15 wherein detecting an unbalanced condition between the storage nodes based at least in part on the monitored latencies comprises determining if at least one of the storage nodes has a relatively high latency that deviates by more than a threshold amount from an average latency of the storage nodes.

17. The computer program product of claim 15 wherein adjusting an assignment of slices of the logical address space of the distributed storage system to the storage nodes responsive to the detected unbalanced condition comprises increasing a number of the slices assigned to one or more of the storage nodes having relatively low latencies and decreasing a number of slices assigned to one or more of the storage nodes having relatively high latencies.

18. A method comprising:

monitoring latencies associated with processing of input-output operations in a plurality of storage nodes of a distributed storage system;

detecting an unbalanced condition between the storage nodes based at least in part on the monitored latencies; and responsive to the detected unbalanced condition, adjusting an assignment of slices of a logical address space of the distributed storage system to the storage nodes;

wherein the slices of the logical address space comprise respective sets of contiguous pages corresponding to respective different fractional portions of a given logical storage volume;

wherein the different fractional portions of the given logical storage volume are stored on different ones of the storage nodes utilizing the corresponding slices assigned to that storage node;

wherein each of at least a subset of a plurality of storage nodes of the distributed storage system comprises a set of processing modules configured to communicate with corresponding sets of processing modules on other ones of the storage nodes, the sets of processing modules of the storage nodes of the distributed storage system collectively comprising at least a portion of a distributed storage controller of the distributed storage system; and wherein monitoring latencies associated with processing of input-output operations in the storage nodes comprises:

obtaining latency measurements from flow control components implemented in respective ones of the processing modules implemented in respective ones of the storage nodes; and utilizing the latency measurements in a feedback loop for adjusting a choker size to limit concurrent processing of input-output operations in the distributed storage system;

wherein one or more of the sets of processing modules each comprise at least a routing module, a control module and a data module;

wherein adjusting an assignment of slices of the logical address space of the distributed storage system to the storage nodes responsive to the detected unbalanced condition comprises modifying a number of the slices assigned to control modules of one or more of the storage nodes based at least in part on latencies of the corresponding one or more storage nodes; and wherein the method is performed by at least one processing device comprising a processor coupled to a memory.

19. The method of claim 18 wherein detecting an unbalanced condition between the storage nodes based at least in part on the monitored latencies comprises determining if at least one of the storage nodes has a relatively high latency that deviates by more than a threshold amount from an average latency of the storage nodes.

20. The method of claim 18 wherein adjusting an assignment of slices of the logical address space of the distributed storage system to the storage nodes responsive to the detected unbalanced condition comprises increasing a number of the slices assigned to one or more of the storage nodes having relatively low latencies and decreasing a number of slices assigned to one or more of the storage nodes having relatively high latencies.

21. The method of claim 18 wherein adjusting the assignment of slices to the storage nodes results in a first one of the different fractional portions of the given logical storage volume being reassigned from a first one of the storage nodes to a second one of the storage nodes while a second one of the different fractional portions of the given logical storage volume remains assigned to the first storage node.

* * * * *